United States Patent [19]

Takahashi et al.

[11] Patent Number: 5,583,543
[45] Date of Patent: Dec. 10, 1996

[54] PEN INPUT PROCESSING APPARATUS

[75] Inventors: Masamitsu Takahashi, Nara; Yukihiro Shibata, Kyoto; Aki Miake, Nara; Hiroshi Okuno, Nara; Hiroshi Nishida, Nara; Yutaka Nakamura, Kyoto; Hiroyuki Shigematsu; Satoshi Hirohata, both of Nara, all of Japan

[73] Assignee: Sharp Kabushiki Kaisha, Japan

[21] Appl. No.: 143,786

[22] Filed: Nov. 1, 1993

[30] Foreign Application Priority Data

Nov. 5, 1992 [JP] Japan ................................. 4-296155
Nov. 25, 1992 [JP] Japan ................................. 4-315327

[51] Int. Cl.⁶ .................................................. G09G 5/00
[52] U.S. Cl. ...................... 345/173; 345/179; 382/189
[58] Field of Search ................................. 345/156, 173, 345/179, 145, 146, 157, 162, 168, 172, 174–178, 180, 182, 148, 123, 121; 178/18; 382/10, 13, 14, 57, 59, 186–189, 116; 395/149, 155, 161, 151; 385/89

[56] References Cited

U.S. PATENT DOCUMENTS

| | | | |
|---|---|---|---|
| 3,777,153 | 12/1973 | Anderson et al. | 385/89 |
| 4,654,874 | 3/1987 | Yamamoto | 382/13 |
| 4,860,372 | 8/1989 | Kuzunuki et al. | 345/146 |
| 4,972,496 | 11/1990 | Sklarew | 382/13 |
| 5,063,600 | 11/1991 | Norwood | 345/173 |
| 5,191,622 | 3/1993 | Shojima et al. | |
| 5,220,649 | 6/1993 | Forcier | 395/148 |
| 5,252,951 | 10/1993 | Tannenbaum | 345/173 |
| 5,260,697 | 11/1993 | Barrett et al. | 345/179 |
| 5,267,327 | 11/1993 | Hirayama | 382/13 |
| 5,347,295 | 9/1994 | Agulnick et al. | 345/156 |
| 5,347,624 | 9/1994 | Takanushi et al. | 395/157 |

FOREIGN PATENT DOCUMENTS

| | | |
|---|---|---|
| 0416176A1 | 3/1991 | European Pat. Off. . |
| 51-93830 | 8/1976 | Japan . |
| 62-28828 | 2/1987 | Japan . |
| 62-256023 | 11/1987 | Japan . |
| 3-150625 | 6/1991 | Japan . |
| WO92/16900 | 3/1992 | WIPO . |
| WO92/08183 | 5/1992 | WIPO . |

OTHER PUBLICATIONS

Lipscomb, "A Trainable Gesture Recognizer", Pattern Recognition, vol. 24, No. 9, 1992, Oxford, GB, pp. 895–907.
Stylus User Interfaces For Manipulating Text, "Proceedings of the ACM Symposium on User Interface Software and Technology", Hilton Head, SC, Nov. 11–13, 1991, pp. 127–135.
Handwriting Recognition in the Go Operating System, Compcon Spring '91, Digest of Papers, San Francisco, California, Feb. 25–Mar. 1, 1991, pp. 483–486.
Gestures in Multimodal Human–Computer Interaction, "Human Aspects in Computing, Proceedings of the 4th International Conference on Human–Computer Interaction", F. R. Germany, Sep. 1–6, 1991, vol. 1, pp. 716–721.

Primary Examiner—Steven Saras
Attorney, Agent, or Firm—Nixon & Vanderhye

[57] ABSTRACT

A pen input processing apparatus in accordance with the present invention has a text editing section for displaying on a screen a window through which a character is handwritten only by handwriting on the screen a line drawing indicative of inputting of character by handwriting. The text editing section has a function wherein the name of gesture command corresponding to a line drawing and the character to be edited are displayed by the screen when each line drawing is handwritten with respect to the screen. The pen input processing apparatus has a gesture command judging section for recognizing the gesture command in accordance with a trace coordinate of the line drawing. When the gesture command is recognized and specified, the recognition of the gesture command is informed by a sound. Only one line drawing is assigned to the same editing instructions for one character and a plurality of characters as editing objects. The present apparatus is arranged so as to ignore a minute moving of an inputting pen, thereby making it easy to perform specifying operation of a graphic on the screen for example.

35 Claims, 17 Drawing Sheets

FIG. 13

| REFERENCE STROKE | COMMAND | REFERENCE STROKE | COMMAND |
|---|---|---|---|
| | DELETE ONE CHARACTER | | DELETE PART OF DOCUMENT (AFTER SPECIFYING AREA) |
| | UNDERLINE | | COPY (TO) |
| | SPACE (ONE CHARACTER) | | MOVE (TO) |
| | SPACE (MORE THAN ONE CHARACTER) | | PAGE UP |
| | CARRIER RETURN | | PAGE DOWN |
| | CENTER | | HANDWRITTEN ENTRY |
| | ALIGN RIGHT | | RESTORE DELETE |

GENERAL OPERATION

EXAMPLE

ACTUAL OPERATION

PEN DEFLECTION

CIRCLE POSITION MOVES

PEN INPUT PROCESSING APPARATUS

This application is related to commonly assigned application Ser. No. 08/136,209 filed Oct. 15, 1993.

FIELD OF THE INVENTION

The present invention relates to a pen input processing apparatus which can edit information displayed on a screen in accordance with handwritten instructions which are given by means such as a pen.

BACKGROUND OF THE INVENTION

In conventional information processing apparatuses such as a word processor, computer, and graphic data creating apparatus, infomation inputting is generally carried out through a keyboard. The operation of infomation inputting through keyboard is hereinafter referred to as key inputting. In such information processing apparatus, when the editing is carried out with respect to an object such as a document, it has been done in the following manner: first, an editing point or editing area is specified by moving a cursor responsive to a key operation; and thereafter a desired editing process is carried out through further key operations. Nowadays, other than the foregoing information processing apparatuses, apparatus is known which can carry out coordinate inputting by directly pointing a screen by means of a coordinate inputting-use pen, and can carry out inputting of character with respect to the screen. Such apparatus is hereinafter generally referred to as a pen input processing apparatus.

The following description deals with an example wherein inputting of characters by handwriting is carried out by the use of the above-mentioned pen input processing apparatus which can input the information that is directly handwritten on the screen. Such inputting of information by directly handwriting it on the screen hereinafter referred to as inputting by handwriting.

As shown in FIG. 16, for example, when a word "very" is added before the word "fine" of a sentence "It is fine today.", first a cursor 52 of the end of the sentence on a screen 51 of FIG. 16(a) is moved to the position of character "f" through means such as a key and pen as shown in FIG. 16(b). Thereafter, when a handwriting button 54, in a guidance area 53 which is provided in the lower portion of the screen 51, is pressed, an inputting board 55 for handwriting appears, as shown in FIG. 16(c), on an upper side of the guidance area 53. So, when the word "very" is handwritten in a window 56 in the inputting board 55, the word "very" is added before the word "fine" in the sentence.

There are pen input processing apparatuses which can carry out the inputting by handwriting by a so-called gesture function for editing the sentence and other objects in accordance with an instruction which is directly handwritten on the screen. Such pen input processing apparatus stores a plurality of commands for a variety of editing processes so as to correspond to line drawings having respective unique shapes. When a line drawing is made as an instruction on the screen through an instrument such as a pen, the command corresponding to the shape of the line drawing is recognized so as to carry out the editing process accordingly.

However, in the case where the above-mentioned inputting of characters by handwriting is carried out, it is necessary (1) to operate so as to specify the position of the cursor 52; and (2) to operate the handwriting button 54 so as to display the inputting board 55. Such case presents a problem that the cursor 52 and the handwriting button 54 are not simple to operate since they are far away from each other.

In the pen input processing apparatus which can edit in accordance with handwritten instructions, the user is not informed as a routine (1) whether or not the command for editing is correctly inputted and (2) whether or not the inputted command is recognized in accordance with the user's intentions. Thus, the user can not verify until the editing process is over whether or not the inputted command is correctly recognized. Namely, the user can verify only by comparing the displayed content of before editing with that of after editing whether or not the inputted line drawing corresponded to the intended command.

Since each editing function corresponds to each unique shape of line drawing, it is required to prepare a number of line drawings which coincides with that of possible editing functions. So, when the number of the editing functions increases, line drawings are adopted which may have respective unmemorable and complicated shapes, thereby forcing the user to study more in order to handle well the respective editing functions. Additionally, when the number of the line drawings increases, the recognizing processes become more complicated accordingly, thereby causing the recognition speed and recognition ratio to be lower.

In the conventional information processing apparatus which can edit by both the inputting by handwriting and the key inputting, the key inputting is available during carrying out of the editing process in accordance with the handwritten input. Accordingly, the key inputting may cause incorrect edits during editing in accordance with the handwritten input. More specifically, in a case where a space should be inserted during editing process, when the user imprudently touches a key, another processing such as deleting of one character may interrupt the main processing, thereby changing the editing contents.

The following description points out other problems of the conventional pen input processing apparatus. In the conventional pen input processing apparatus, in a case where a graphic and frame on the screen are specified by a pen, the fact that (1) a pen-down and (2) a deflection of the pen are simultaneously done is mistakenly regarded as having received an instruction to drag (moving operation), with the result that the frame and graphic on the screen delicately moves. This is because the pen-down and pen-up are carried out at the same one point and such difficulty is not considered in specifying a point with the pen.

More specifically, in a circle of FIG. 17 (a), it is assumed that a hatched line should be changed into a broken line. In such case, as shown in FIG. 17(c), a circle is specified with a pen 62. Thereafter, as shown in FIGS. 17(d) and 17(e), the following operation is generally carried out, i.e., the kind of hatching is changed in accordance with a function or an icon. However, under the conventional environment, when the circle is specified with the pen, as shown in FIG. 17(f), the pen is deflected such that the pen-down and pen-up operations are not made at the same one point, thereby frequently resulting in that the specified circle moves from the original location.

SUMMARY OF THE INVENTION

It is a first object of the present invention to provide a pen input processing apparatus by which inputting by handwriting becomes simpler to operate and which can carry out more practical editing in accordance with the inputting by handwriting.

It is a second object of the present invention to provide a pen input processing apparatus which absorbs a pen deflection during pen-down and pen-up operations such that an operator can easily specify a graphic and frame.

In order to achieve the foregoing first object, the pen input processing apparatus of the present invention is characterized by having at least the following means:

(1) inputting means for carrying out inputting by handwriting with respect to a screen for displaying information;

(2) memory means for storing editing instructions corresponding to respective handwritten line drawings;

(3) recognizing means for recognizing an editing instruction corresponding to a handwritten line drawing in accordance with the editing instruction stored in the memory means and the handwritten line dwawing when the handwritten line drawing is overlapped by the inputting means onto information displayed on the screen; and (4) handwriting input area displaying means for displaying of a handwriting input area so as to carry out character inputting with respect to the screen when the recognizing means recognizes an editing instruction for instructing the character inputting by handwriting.

With the arrangement, when the editing instruction for carrying out the inputting of character by handwriting is recognized, the handwriting input area displaying means displays the handwriting input area through which the inputting of character handwritten with respect to the screen. So, the handwriting input area is displayed on the screen only by drawing on the screen a line drawing indicative of the inputting of character by handwriting, thereby respectively enabling to specify a position of the inputting by handwriting and to display the handwriting input area in accordance with only one operation. Thus, the present pen input processing apparatus makes the operation simpler, thereby remarkably improving the easiness of operation during the inputting by handwriting.

In order to achieve the foregoing first object, the pen input processing apparatus of the present invention is characterized by having at least the following means in addition to the structure of (1) through (3):

(5) keyboard means for generating key data for key inputting in accordance with key operations; and (6) key input nullifying means for nullifying the key inputting during editing in accordance with the handwritten input.

With the arrangement, the key inputting through the keyboard means is nullified by the key input nullifying means during editing in accordance with the handwritten input. So, no interrupting for executing another kind of editing instruction occurs through the key inputting during executing of the current editing instruction in accordance with the handwritten input, thereby avoiding error operations.

In order to achieve the foregoing first object, the pen input processing apparatus of the present invention is characterized by having at least the following means in addition to the structure of (1) through (3):

(7) informing means for informing an error by sounds that the specific editing instruction is recognized by the recognizing means.

With the arrangement, the informing means informs by the sound that the editing instruction has been just recognized by the recognizing means. So, the user can verify that the handwritten line drawing of the screen is correctly recognized as the editing instruction.

In order to achieve the foregoing first object, the pen input processing apparatus of the present invention is characterized by having at least the following means in addition to the structure of (1) through (3):

(8) editing instruction displaying means for displaying on the screen a name of an editing instruction recognized by the recognizing means upon recognition thereof.

With the arrangement, when the editing instruction is recognized, the name of the editing instruction is displayed on the screen by the editing instruction displaying means. So, the user can verify on the screen that the handwitten line drawing on the screen is correctly recognized as the editing instruction, and can verify according to the name of editing instruction displayed on the screen whether or not the recognized editing instruction is as the user intended. As a result, the present apparatus becomes remarkably simpler to operate.

When editing object displaying means is further added to the structure of (1), (2), (3) and (8), it is more accurately verified whether or not the recognized editing instruction is the intended one.

In order to achieve the foregoing first object, another pen input processing apparatus in accordance with the present invention is characterized by having at least the following means:

(9) inputting means for carrying out inputting by handwriting with respect to a screen, and for specifying a position on the screen;

(10) memory means for storing a plurality of editing instructions corresponding to respective handwritten line drawings;

(11) recognizing means for recognizing an editing instruction corresponding to a handwritten line drawing in accordance with the editing instruction stored in the memory means and the handwritten line dwawing when the handwritten line drawing is overlapped by the inputting means onto one character displayed on the screen; and

(12) editing means for carrying out editing processing with respect to the one character when the recognizing means recognizes the editing instruction, and for carrying out the same editing processing with respect to a plurality of characters as that of one character when an area having the plurality of characters is preliminarily specified by the inputting means.

With the arrangement, when the area having the plurality of characters is preliminarily specified by the inputting means, the same editing processing (for example, deleting) carried out irrespective of the number of characters by only one line drawing having the same shape. Thus, it not necessary to change the shape of line drawing depending on the number of characters with respect to one kind of editing instruction. Accordingly, the handling of the apparatus becomes simpler to operate, and the recognizing means can swiftly recognize the editing instruction correspond to the handwritten line drawing.

When editing instruction limiting means, for limiting the kinds of the editing instructions which are carried out by the editing means based on a fact that the area is preliminarily specified, is further added to the structure of (9) through (12), it is possible not to execute the editing instruction (for example, inserting of character) causing the error operations when the area to be edited is specified. Accordingly, it is possible to improve the function wherein the error operations are a voided and to more improve the recognizing ratio of the editing instructions.

In order to achieve the foregoing second object, a pen input processing apparatus in accordance with the present invention is characterized by having at least the following means:

(13) a pen;

(14) tablet means for outputting a coordinate of a point which is touched by the pen;

(15) judging means for judging (1) a distance between a first point and second point or (2) a reference value when the pen touches the first point on the tablet means, slides on the tablet means and leaves the tablet means at the second point; and

(16) processing means for ignoring the sliding of the pen when the distance is smaller than the reference value.

With the arrangement, the sliding of pen is regarded as undesired sliding and ignored when the distance is smaller than the reference value. Accordingly, such undesired error operations can be avoided due to the deflection of pen that the graphic and window specified by the pen, for example, move against user's intention.

Further scope of applicability of the present invention will become apparent from the detailed description given hereinafter. The present invention will become more fully understood from the accompanying drawings which are given by way of illustration only, and thus, are not limitative of the present invention.

BRIEF DESCRIPTION OF THE DRAWINGS

FIG. 13 is an explanatory diagram showing a relation between a basic stroke of line drawing and an editing instruction.

DESCRIPTION OF THE EMBODIMENTS

[First Embodiment]

The following description describes one embodiment of the present invention with reference to FIGS. 1 through 13.

Figure 2:
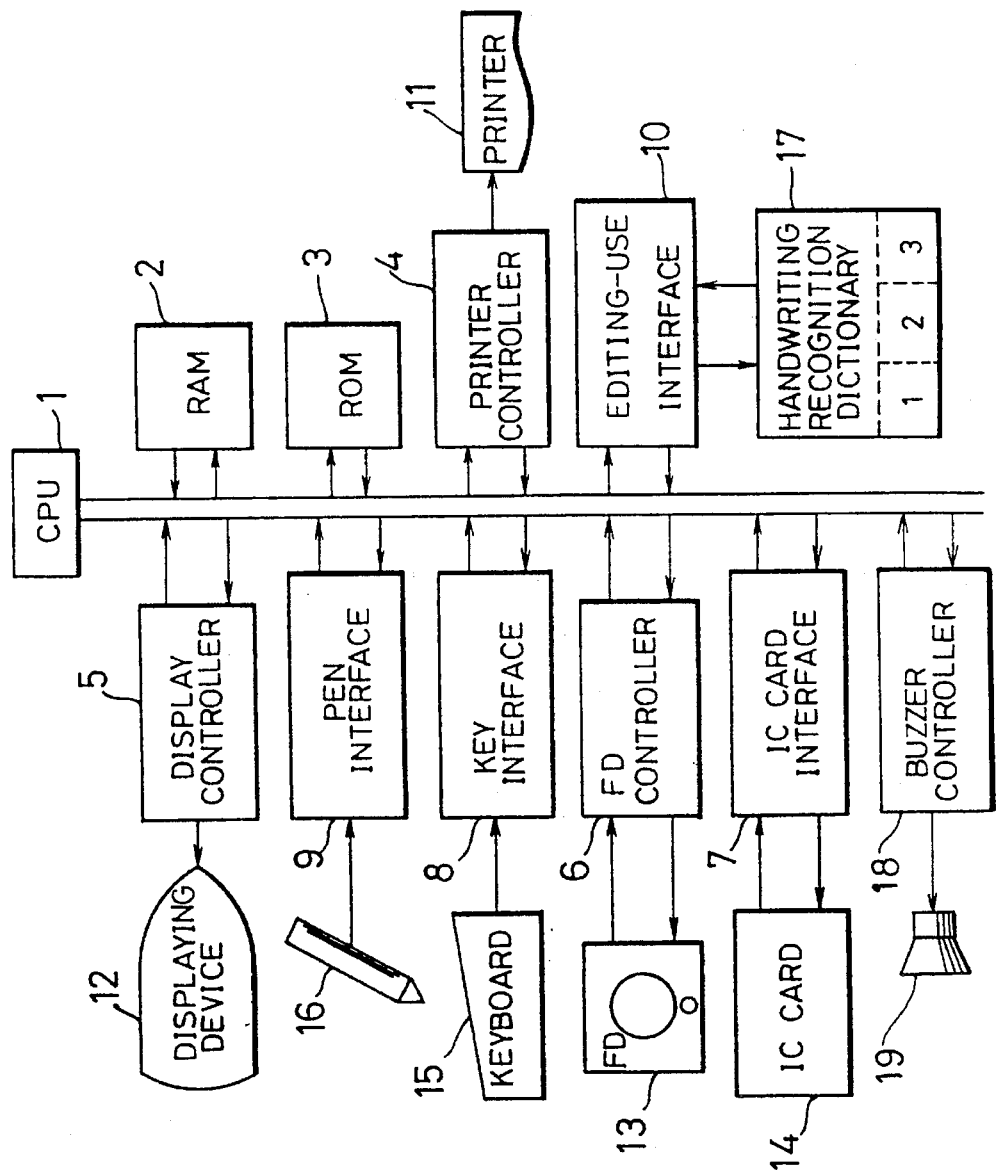
FIG. 2 is a block diagram showing the schematic structure of a main portion of the pen input processing apparatus.
Figure 3:
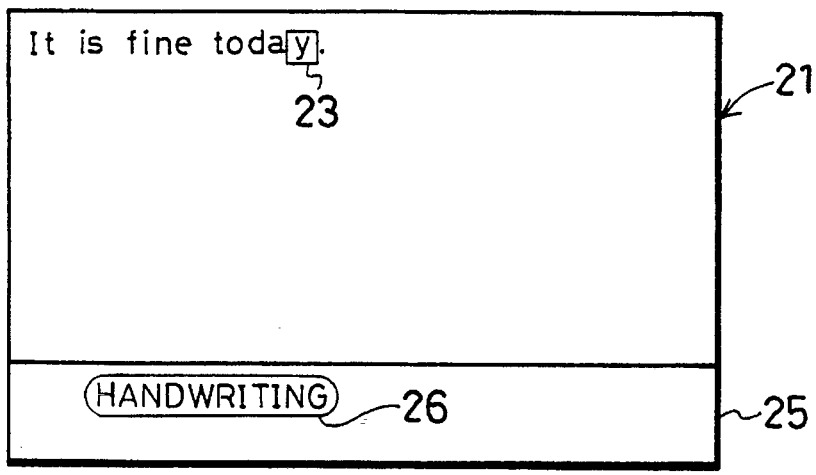
FIGS. 3(a) to 3(c) are explanatory diagrams showing a concrete example of operation for changing the inputting mode into a mode for inputting of character by handwriting.
Figure 3:
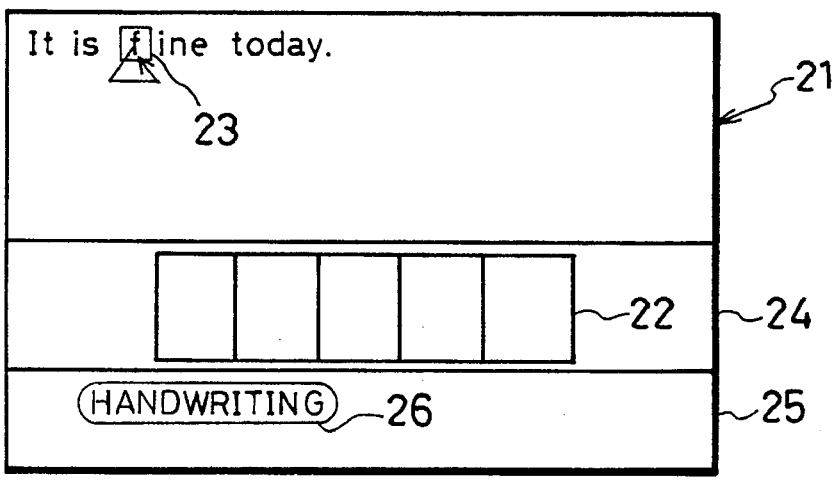
Figure 3:
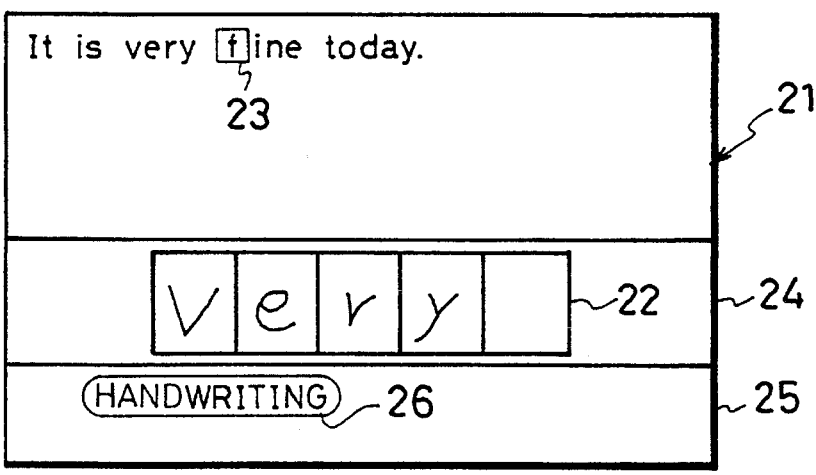

A pen input processing apparatus in accordance with the present invention, as shown in FIG. 2, is provided with the following elements as a controlling section, i.e., a CPU (Central Processing Unit) 1, a ROM (Read Only Memory) 3, a RAM (Random Access Memory) 2, a printer controller 4, a display controller 5, an FD controller 6, an IC card interface 7, a key interface 8, a pen interface 9, and an editing-use handwriting inputting interface 10 (hereinafter referred to as an editing-use interface 10). The present pen input processing apparatus can do tasks, in response to a keyboard 15 connected with the key interface 8, such as a cursor moving, inputting of characters, and editing. Such tasks can also be done in accordance with an input pen 16 connected with the pen interface 9 according to the present apparatus.

The CPU 1 is a central controlling section for controlling respective operations of the pen input processing apparatus. The CPU 1 is connected with the above-mentioned elements through a main bus. The CPU 1 carries out the cursor moving, inputting of characters, editing, and other processings in response to the inputting operation of the keyborad 15 and input pen 16.

In addition to the above-mentioned fundamental functions, the CPU 1 has a function which displays a handwriting input area for inputting by handwriting during editing in accordance with the handwritten input. More specifically, in a case where a line drawing handwritten by the input pen 16 corresponds to a gesture command instructing to carry out an editing mode in accordance with the handwritten input, when the gesture command is recognized by the editing-use interface 10, the CPU 1 controls a screen 21 so as to display a window 22 as the handwriting input area (see FIGS. 3(a) through 3(c)). Thus, the CPU 1 has a function as a handwriting input area displaying means. The above-mentioned gesture command is an instruction to execute an application program and is also an instruction corresponding to a specific pattern which is compared with a shape of a handwritten line drawing.

The CPU 1 has also a function as key input nullifying means which can nullify a key inputting from the keyboard 15 during editing mode which is carried out in accordance with the handwritten input.

Further, the CPU 1 and buzzer controller 18 have a function as informing means. More specifically, when the CPU 1 informs the buzzer controller 18 that the gesture command has been recognized in accordance with the handwritten line drawing, the buzzer controller 18 rings a buzzer 19 in a low tone. In contrast, when the CPU 1 informs the buzzer controller 18 that the gesture command has not been recognized although there exists the handwritten line drawing, the buzzer controller 18 rings the buzzer 19 in a high tone.

Figure 5A:
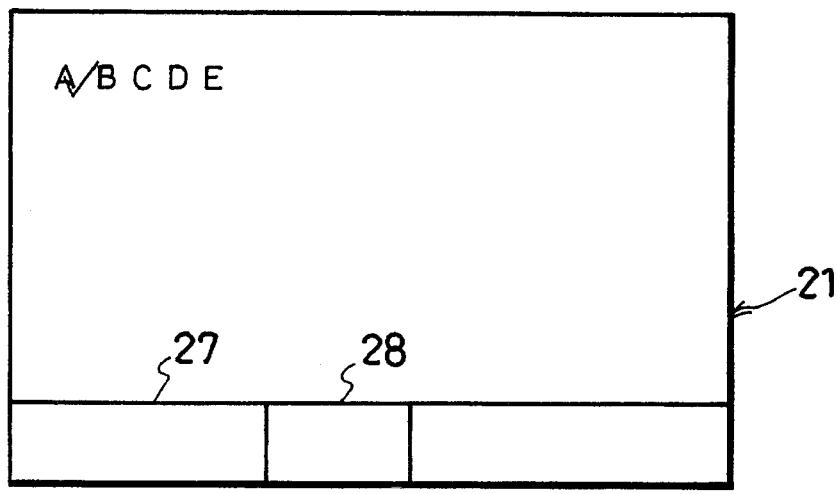
FIGS. 5(a) and 5(b) are explanatory diagrams respectively showing a display of command name of recognized gesture command and a character to be edited.
Figure 5B:
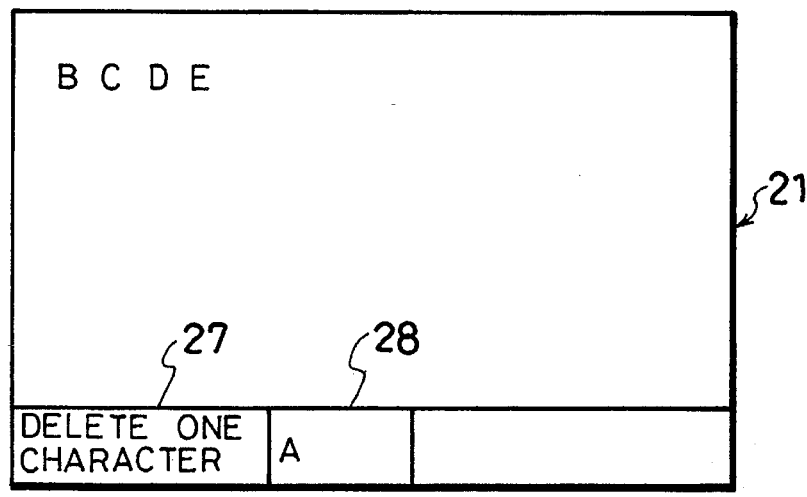

In addition thereto, the CPU 1 controls (1) a command name displaying area 27 in a bottom corner of the screen 21 so as to display a name of the recognized gesture command (see FIGS. 5 (a) and 5 (b)), and controls (2) an editing character displaying area 28 so as to display at least one of the characters to be edited. Thus, the CPU 1 has functions as editing instruction displaying means and editing object displaying means.

The following description deals with the foregoing functions in more detail.

In such functions, the command name of each recognizable gesture command is associated with an integer JTYPE of not less than zero. The character number of each displaying command name is stored in a count table (COUNTALBE) in correspondence with its JTYPE. A pointer, indicative of each head end of the address from which each gesture command of a gesture command table 37 (described later) is stored, is stored in a pointer table (MOJIPTR) in correspondence with its JTYPE. Table 1 is an example of summarizing of the above-mentioned relation. JTYPE is set to −1 when the handwritten line drawing could not be recognized as a gesture command.

TABLE 1

| JTYPE | COUNTTABLE | COMMAND NAME |
|---|---|---|
| 0 | 18 | DELETE ONE CHARACTER |
| 1 | 6 | CENTER |
| 2 | 10 | ALIGN RIGHT |
| . | . | . |
| . | . | . |
| . | . | . |

Each value of the count table is counted by a working-use counter. Each value of the pointer table is stored in a working-use pointer. The command name corresponding to the value of the working-use pointer is displayed such that the character number of the command name coincides with the counted value of the working-use counter.

Whether a character to be edited exists or a series of characters to be edited exists corresponds to whether the value of PCOUNT is "1" or "0". More specifically, when the PCOUNT value is "1", according to a pointer (POINTMOJIPTR) indicative of one character or the head end of characters of the series of characters in a text memory 39 (described later) which is to be edited, either the one character or at least one character of the head end of the series of characters is displayed. In contrast, when the PCOUNT value is "0", the editing character displaying area 28 displays a space of one character. Note that the editing character displaying area 28 may display a few characters from the heading character of the series of characters in order to easily discriminate between (1) one series of characters which are to be edited and (2) another series of characters.

The RAM 2 is a memory which can write/readout data at random and which has a function for temporarily storing the inputted data, results calculated by the CPU 1 and other data. The RAM 2 has therein a plurality of working areas. The ROM 3 is a read only memory which preliminarily stores program and data for operating the present pen input processing apparatus and other data.

Figure 1:
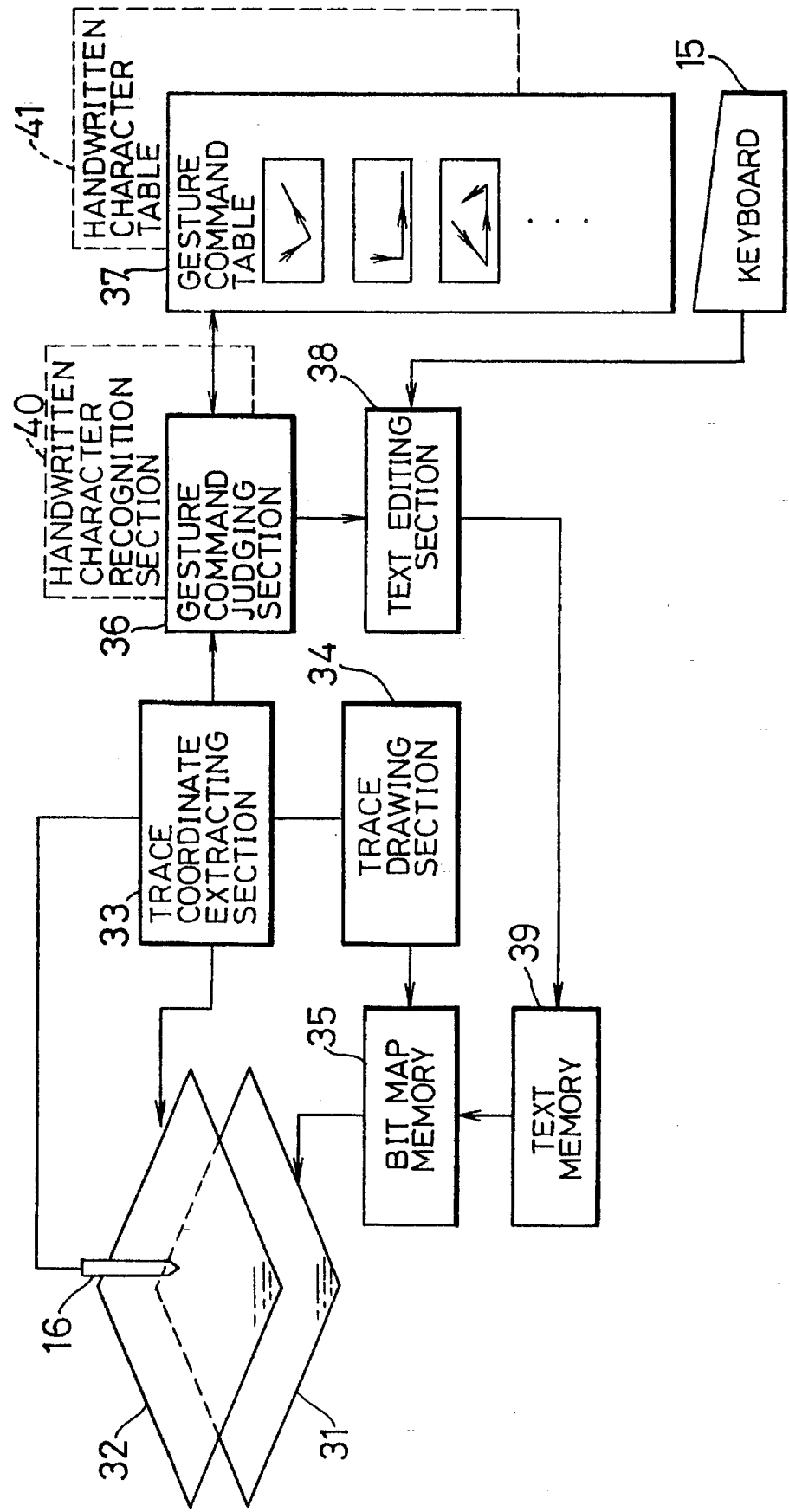
FIG. 1 is a block diagram showing the basic structure for processing a gesture command in a pen input processing apparatus of one embodiment in accordance with the present invention.

The printer controller 4, which is connected with a printer 11, controls a printing operation of the printer 11 in accordance with an instruction from the CPU 1. The display controller 5 converts the displaying data from the CPU 1 in to video signal so as to supply to a displaying device 12. The display controller 5 also controls a displaying operation of the displaying device 12 in accordance with an instruction from the CPU 1. As shown in FIG. 1, the displaying device 12 is provided with a display 31 and a tablet 32 (both described later).

The FD controller 6 controls a floppy disk device 13 in communication with the CPU 1. The IC card interface 7 contains an IC card-use slot so as to relay the communication between (1) a CPU and a memory in an IC card 14 and (2) the CPU 1. Loading/saving of data can be made with respect to a floppy disk and the IC card 14 of the floppy disk device 13 in accordance with the controllings of the FD controller 6 and the IC card interface 7 respectively.

The key interface 8, which is connected with the keyboard 15, receives the data from the keyboard 15. More specifically, the key interface 8 recognizes which key is pressed through the keyboard 15, and releases key data corresponding to the pressed key. The pen interface 9, which is connected with input pen 16 as inputting means such as a stylus pen, receives pen data generated by the input pen 16.

The editing-use interface 10, which is connected with a handwriting recognition dictionary 17, reads out the gesture command stored in the handwriting recognition dictionary 17. The editing-use interface 10 recognizes the gesture command corresponding to the shape of handwritten line drawing with the input pen 16 in accordance with the pen data through the pen interface 9. Thus, the corresponding gesture command is specified. The editing-use interface 10 has a function as recognizing means.

The editing-use interface 10 reads out a gesture command in different manners according to the following cases (1) and (2). One is the case (1) where an area specifying mode is set wherein the editing processing is carried out, in accordance with one gesture command, with respect to a series of characters of the editing area which is specified for a plurality of characters, and the other is the case (2) where an ordinary editing mode is set wherein the editing processing is carried out with respect to one character in accordance with one gesture command.

More specifically, three kinds, for example, of dictionaries are prepared for the handwriting recognition dictionary 17. The gesture command is read out of dictionaries 17-1 and 17-2 for the area specifying mode, while the gesture command is read out of dictionaries 17-1 and 17-3 for the ordinary editing mode. Accordingly, the editing functions which are available during the area specifying mode are restricted. For example, the functions such as a character inserting function which is not available during specifying the area through the key inputting are excluded from the objects to be recognized. Thus, the editing-use interface 10 has a function as editing instruction limiting means.

The following description deals with fundamental structure, with reference to FIG. 1, for carrying out the inputting by handwriting, and for executing the gesture command.

The fundamental structure is provided with the input pen 16, the display 31, the tablet 32, a trace coordinate extracting section 33, a trace drawing section 34, a bit map memory 35, a gesture command judging section 36, the gesture command table 37, a text editing section 38, a text memory 39, a handwritten character recognizing section 40, and a handwritten character table 41.

The transparent tablet 32 as inputting means is overlapped onto the display 31. When the tablet 32 is touched by a tip of the input pen 16, the tablet 32 generates a voltage, as coordinate information, changing depending on the touched position. The trace coordinate extracting section 33, which is in the pen interface 9, extracts one after another the trace of the input pen on the tablet 32 as the trace coordinate.

The trace drawing section 34 which is provided, like the text editing section 38, in the CPU 1, generates a trace image connecting the trace coordinates extracted by the trace coordinate extracting section 33. The trace image is supplied to the bit map memory 35 which is provided in the RAM 2. The trace image and the image which is currently displayed on the display 31 are synthesized by the bit map memory 35 so as to supply to the display 31.

The gesture command judging section 36, which is provided in the editing-use interface 10, compares the extracted trace coordinate with basic stroke data of the gesture command stored in the gesture command table 37 so as to recognize a gesture command corresponding to the closest basic stroke to the line drawing which is drawn in accordance with the trace coordinate. The gesture command judging section 36 gives to the text editing section 38 (1) the recognized gesture command, and (2) the position information concerning the character or the series of characters which is recognized in accordance with the trace coordinate and is an editing object.

The gesture command table 37 stores the basic stroke data indicated as the line drawing so as to correspond to the gesture command. The gesture command table 37 is provided in the handwriting recognition dictionary 17. FIG. 13, for example, is prepared as the gesture command.

More specifically, in a case of the gesture command for deleting one character, a basic stroke corresponds to a line drawing which is drawn like character V from the left to the right. The character, which is located on a pen-down coordinate in the line drawing, is deleted. The pen-down coordinate coincides with the coordinate of a point on the tablet 32, the point being touched by the input pen 16. In a case of partially deleting of a document where a plurality of characters are deleted, a basic stroke, like the case of one character deleting, is the line drawing which is drawn like character V. When the line drawing like character V is made after specifying an area to be deleted, it is recognized as a partially deleting of the document. In a case of a gesture command for making an underline, a basic stroke data corresponds to a straight line which is drawn on a character or a series of characters to be underlined in a horizontal direction from the left to the right.

The text editing section 38, which is provided in the CPU 1, carries out the editing processing with respect to a corresponding character or a series of characters of the text memory 39 in accordance with (1) the gesture command recognized by the gesture command judging section 36 and (2) the position information which is supplied along with the gesture command. The text editing section 38 receives not only the gesture commands from the gesture command judging section 36, but also the commands from the keyboard 15 so as to carry out the editing processing in accordance with the key operations.

When an editing area of a plurality of characters is specified such that the CPU 1 sets the area specifying mode, the series of characters of the editing area are edited in accordance with the same gesture command as that of the normal editing of one character.

The text memory 39, which is the memory for storing one character or the series of characters displayed by the display 31, is provided in the RAM 2 like the bit map memory 35. The character data in the text memory 39 and the image in the bit map memory 35 are synthesized so as to be displayed by the display 31.

The handwritten character recognizing section 40 is provided in the editing-use interface 10 and is functionally similar in the process to the gesture command judging section 36. The handwritten character table 41 is provided in the handwriting recognition dictionary 17 like the gesture command table 37.

The handwritten character recognizing section 40 compares the trace coordinate extracted by the trace coordinate extracting section 33 with the plurality of basic strokes stored in the handwritten character table 41 so as to recognize a character code corresponding to the closest basic character stroke to the line drawing which is drawn by the trace coordinate and to send the recognized character code to the text editing section 38. Thus, the handwritten character recognizing section 40 carries out the processing similar to the processing which the gesture command judging section 36 recognizes the gesture command in accordance with the trace coordinates. However, when characters are inputted, the editing processing is not required. So, the position information is not supplied to the text editing section 38, thereby making distinction over the gesture command judging section 36.

The following description deals with a concrete example where the inputting by handwriting is made by a pen input processing apparatus having the above-mentioned arrangement.

The following description deals with a procedure for a case, for example as shown in FIG. 3(a), where a word "very" is added before the word "fine" of a sentence "It is fine today." which is displayed on the screen 21 of the display 31, by using the present pen input processing apparatus. First, as shown in FIG. 3(b), a line drawing having a shape like "Δ", which indicates the handwriting inputting of characters, is drawn from a substantial center of character "f" as a base point (pen-down point). By making the line drawing, the mode is moved from the handwriting inputting of gesture commands to the handwriting inputting of characters. Thus, the cursor 23 moves, as shown in FIGS. 3(a) and 3(b), from character "y" to character "f", and thereafter a handwritten recognition-use inputting board 24 appears on the upper portion of a guidance area 25.

The handwritten recognition-use inputting board 24 has the window 22 as the handwriting input area. The window 22 has, for example, a five-character space. The frame data for displaying a border-line is generated by the text editing section 38. When character "v" is written, as shown in FIG. 3(c), in a first inputting area of the window 22, the trace coordinate of character "v" is extracted by the trace coordinate extracting section 33. (1) The image which is drawn by the trace drawing section 34 in accordance with the extracted trace coordinates and (2) the image which is currently displayed on the screen 21 are synthesized by the bit map memory 35 so as to output the synthesized data to the display 31. Thus, each character, which is written by the input pen 16, is simultaneously displayed on the screen 21.

Next, when the input pen 16 leaves the tablet 32, the handwritten character recognizing section 40 compares the trace coordinate with the basic character stroke of the handwritten character table 41 so as to obtain an optimum character code. The text editing section 38 processes in accordance with the optimum character code such that character "v" is added to the text memory 39 and character "v" is inserted before character "f". The character recognition of the first inputting area is carried out as soon as the input pen 16 is put down in a second inputting area of the window 22.

Further, when the second character "e" is written in the second inputting area of the window 22, character "e" is displayed on the screen 21 in the foregoing manner as soon as the input pen 16 is operated such that the sentence of the screen 21 has character "e" after character "v". Characters "r" and "y" are displayed on the screen 21 one after another in the same manners as the foregoing ones.

As mentioned above, the pen input processing apparatus is arranged so as to display the window 22 in accordance with the gestrure command which indicates the inputting of character by handwriting. However, the present pen input processing apparatus is arranged like the conventional apparatus so as to display the window 22 in accordance with the pressing of the handwriting button 26 which is displayed on the guidance area 25 provided in the lower portion of the screen 21.

The following description deals with a concrete example of executing of gesture commands of the present pen input processing apparatus.

Figure 4A:
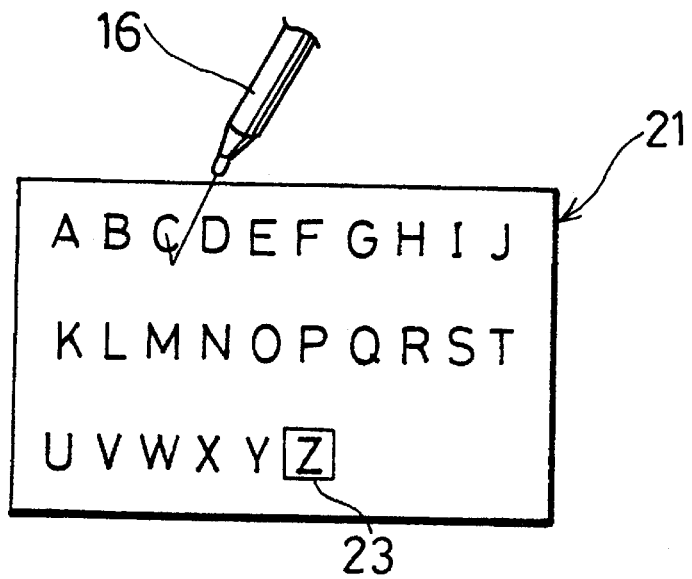
FIGS. 4(a) and 4(b) are explanatory diagrams showing a concrete example of inputting by handwriting of an editing instruction.

In a case where one character "C" is, for example, deleted from a series of characters of FIG. 4(a), when a line drawing having a shape like "V" is drawn with the input pen 16 from a substantial center of character "C" as the base point, the corresponding trace coordinate is extracted by the trace coordinate extracting section 33. The image which is drawn by the trace drawing section 34 in accordance with the extracted trace coordinates and the image which is currently displayed on the screen 21 are synthesized by the bit map memory 35. Accordingly, the line drawing made by the input pen 16 is simultaneously displayed on the screen 21.

Figure 4B:
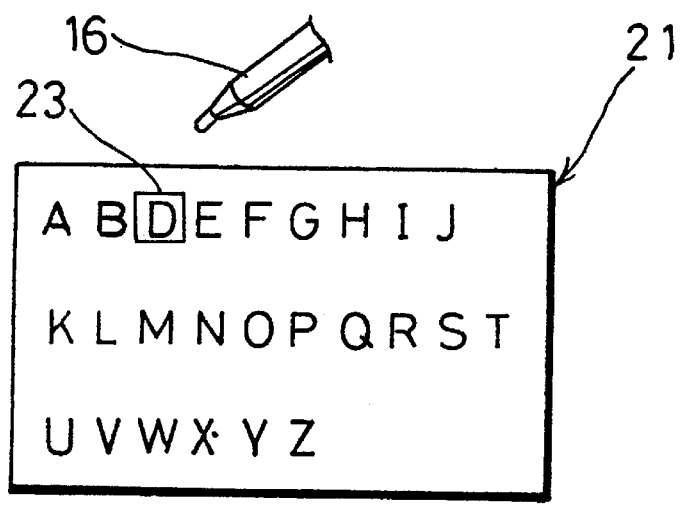

Next, when the input pen 16 leaves the tablet 32, the gesture command for deleting one character, which is obtained by comparing the trace coordinate with the gesture command in the gesture command table 37, is recognized by the gesture command judging section 36. Thereafter, the position information along with the gesure command for deleting of one character is sent to the text editing section 38. In accordance with the processing of the text editing section 38, as shown in FIG. 4(b), the cursor 23 is moved from the current position to a positon responsive to the position information. Character "C" in the text memory 39 is deleted in accordance with the gesture command. The trace coordinate extracting section 33 and other elements are in respective stand-by states for waiting the next inputting by handwriting.

When editing instructions are inputted by handwriting, as shown in FIG. 5(a), (1) the command name displaying area 27 and (2) the editing character displaying area 28 are displayed in a line in the bottom of the screen 21. For example; in a case of deleting one character, when the gesture command judging section 36 recognizes the gesture command for deleting of one character, the code of gesture command in the RAM 2, is converted into a corresponding character by the text editing section 38. A character code of "A" which is to be deleted is once sent to the RAM 2, thereafter it is also converted into a corresponding character by the text editing section 38.

The kind of the gesture command, i.e. , "delete one character" is displayed on the command name displaying area 27, and the character to be deleted, i.e., "A" is displayed on the editing character displaying area 28. When the gesture command is recognized, the buzzer 19 is rung in the low tone along with the above-mentioned displaying.

The following description deals with the difference in the gesture command processing between a case where one character is deleted and a case where a plurality of characters are deleted.

In the sentences "The editing by handwriting permits the following operations. The following description deals with each function of the operations." of FIG. 6(a), when the fourth character "e" is deleted, the line drawing like character "V" is drawn from a substantial center of character "e", thereby deleting the fourth character "e".

Figure 6A:
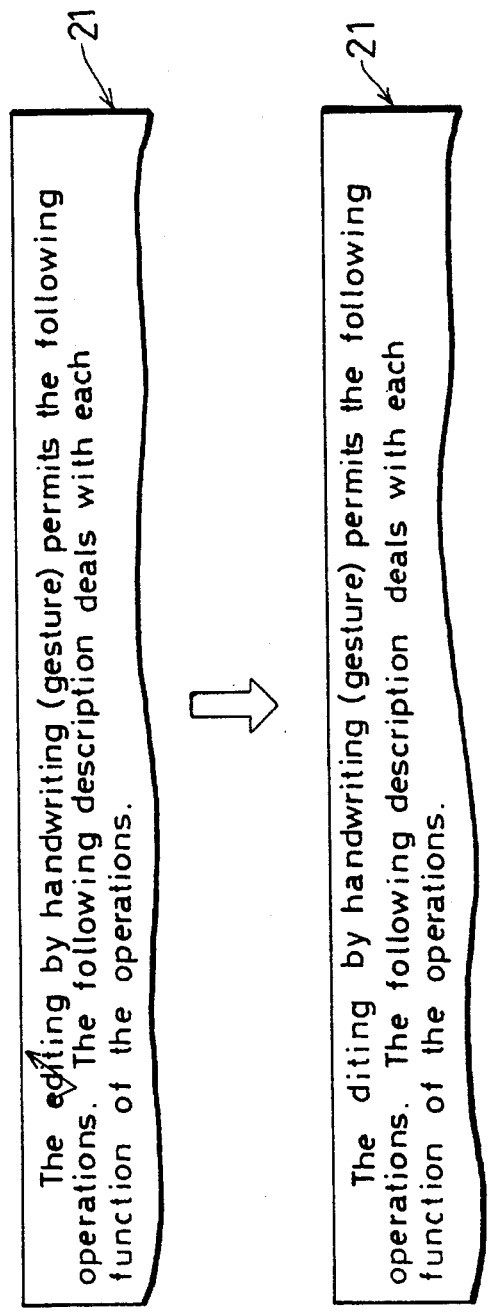
FIGS. 6(a) and 6(b) are explanatory diagrams showing processing of the gesture command during an ordinary editing mode and an area specifying mode, respectively.
Figure 6B:
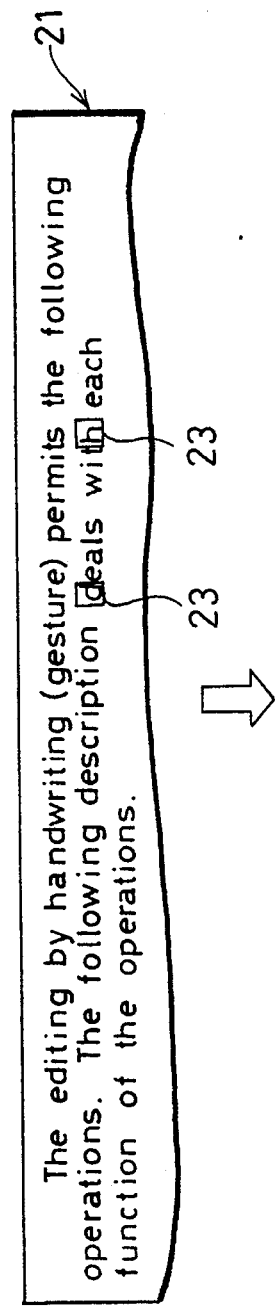
Figure 7A:
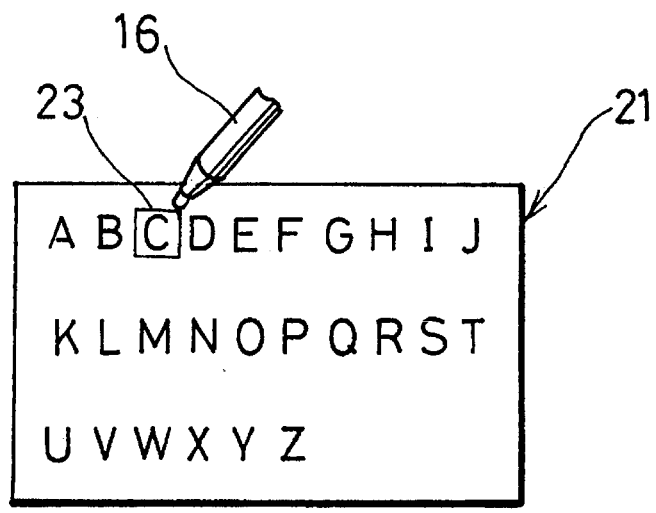
FIGS. 7(a) and 7(b) are explanatory diagrams showing a concrete example of pointing by an inputting pen.
Figure 7B:
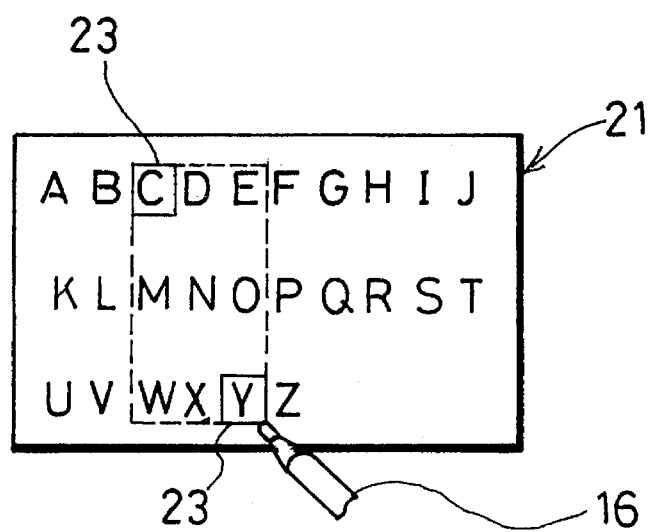

In contrast, in a case where a plurality of characters are deleted, when the area between character "d" of the word "deal" and character "h" of the word "with" is, as shown in FIG. 6(b), specified by the cursor 23 in accordance with the inputting by the input pen 16, the corresponding position data is inputted to the RAM 2. Thereafter, when the gesture command is recognized, the characters of the specified area are deleted in accordance with the position data in the RAM 2.

In the case where the area is specified, the pointing operation through the input pen 16 is employed. However, for example, by pointing characters "C" and "Y" (see FIG. 7(a)) through the input pen rectangular area (see FIG. 7(b)) defined by a diagonal line extending from character "C" to "Y" can be specified. When pointing, only position information is outputted without comparing of the gesture command judging section 36 between the trace coordinate and the gesture command.

The following description deals with a way of processing for carrying out the inputting of characters by handwriting in the present pen input processing apparatus.

Figure 8:
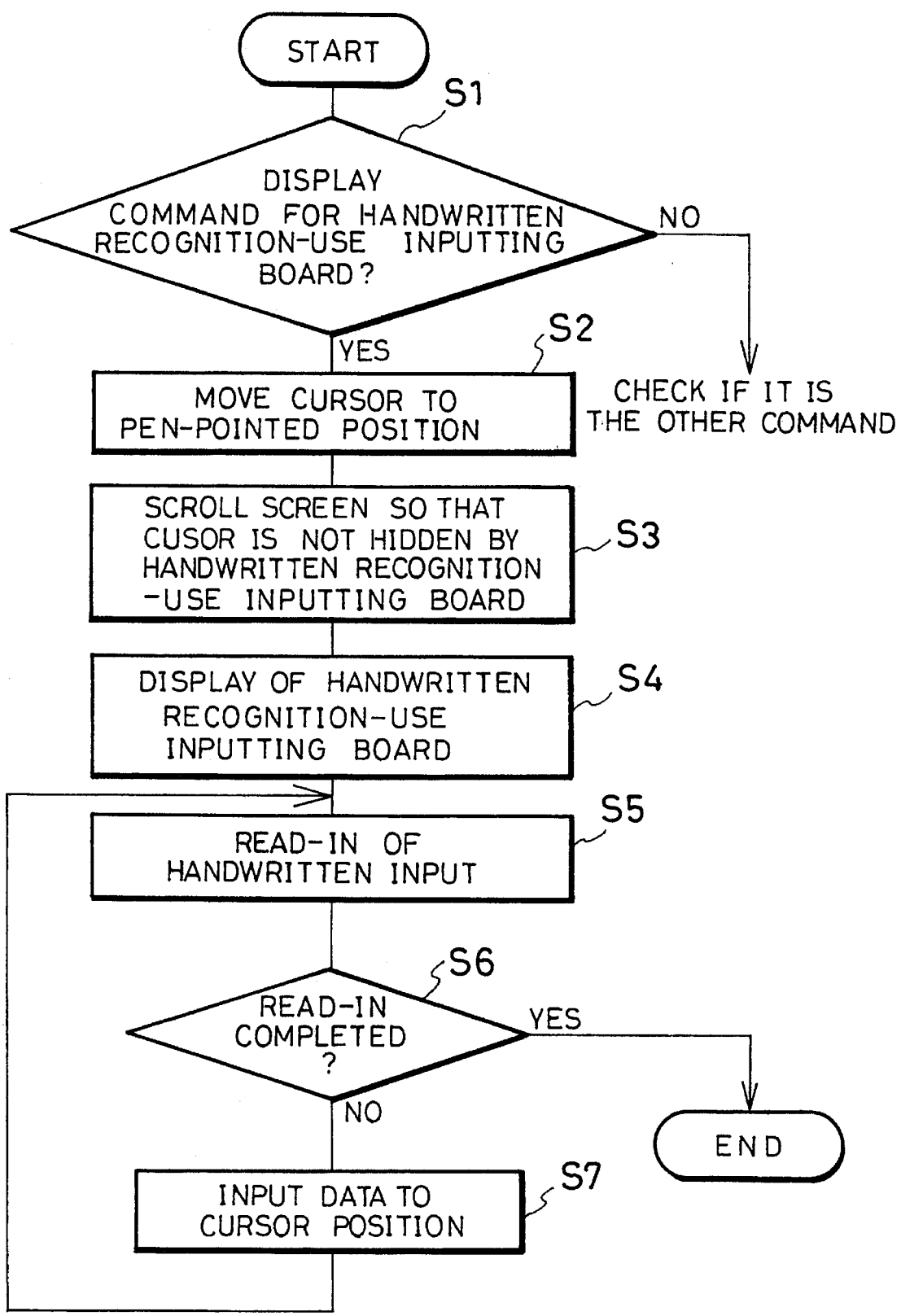
FIG. 8 is flow chart showing a processing mode for changing the inputting mode into the mode for inputting a character by handwriting.

As shown in a flow chart of FIG. 8, when a line drawing is inputted through the input pen 16, it is judged whether or not the gesture command corresponding to the line drawing is for moving to the character inputting by handwriting, i.e., whether or not the gesture command is for displaying of the handwritten recognition-use inputting board 24 (S1). If not, the other command is judged.

When the gesture command is judged for displaying of the handwritten recognition-use inputting board 24 in S1, the cursor 23 is moved to a position to which the coordinate inputting is carried out by the input pen 16 (S2). The screen 21 is scrolled (S3) and the handwritten recognition-use inputting board 24 is displayed (S4) such that the cursor 23 is not hidden during displaying of the handwritten recognition-use inputting board 24.

The character data which are handwritten in the window 22 of the handwritten recognition-use inputting board 24 are read in (S5), thereafter it is judged whether or not the read-in operation is completed (S6). When the input pen 16 is put down in the second area of the window 22 as mentioned above, it is judged that the read-in operation of the character data is completed. When the read-in operation is completed, the processing ends as it is. When the read-in operation is not completed, the data is inputted so as to correspond to the position of the cursor 23 (S7), thereafter returning to S5.

The following description deals with a processing procedure of a case where the key inputting is done during processing of the gesture command.

Figure 9:
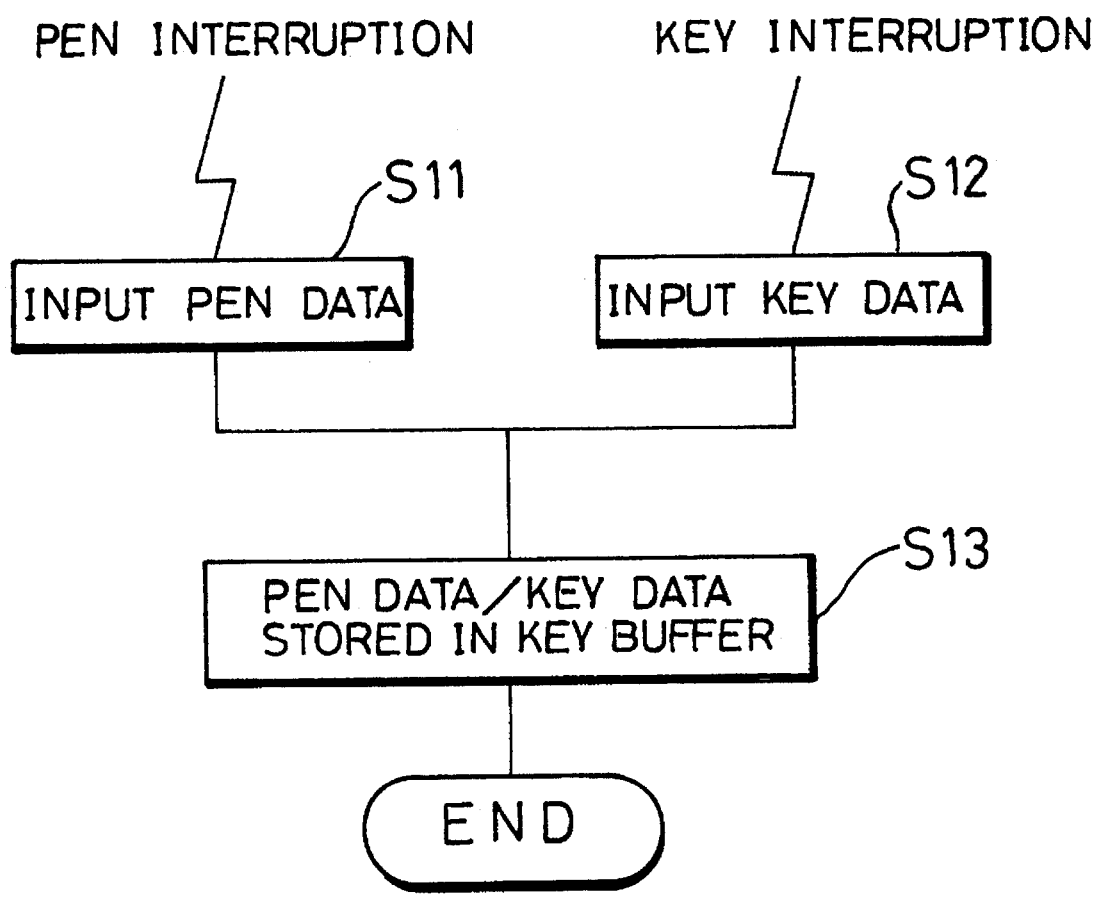
FIG. 9 is a flow chart showing a processing mode for inputting of pen data and key data.

As shown in a flow chart of FIG. 9, the process is carried out wherein the pen data or key data is read-in. In the process, when an interrupting of pen data occurs, the pen data is inputted (S11). In contrast, when an interrupting of key data occurs, the key data is inputted (S12). The inputted pen data or key data is stored in a key buffer of the RAM 2 (S13).

Figure 10:
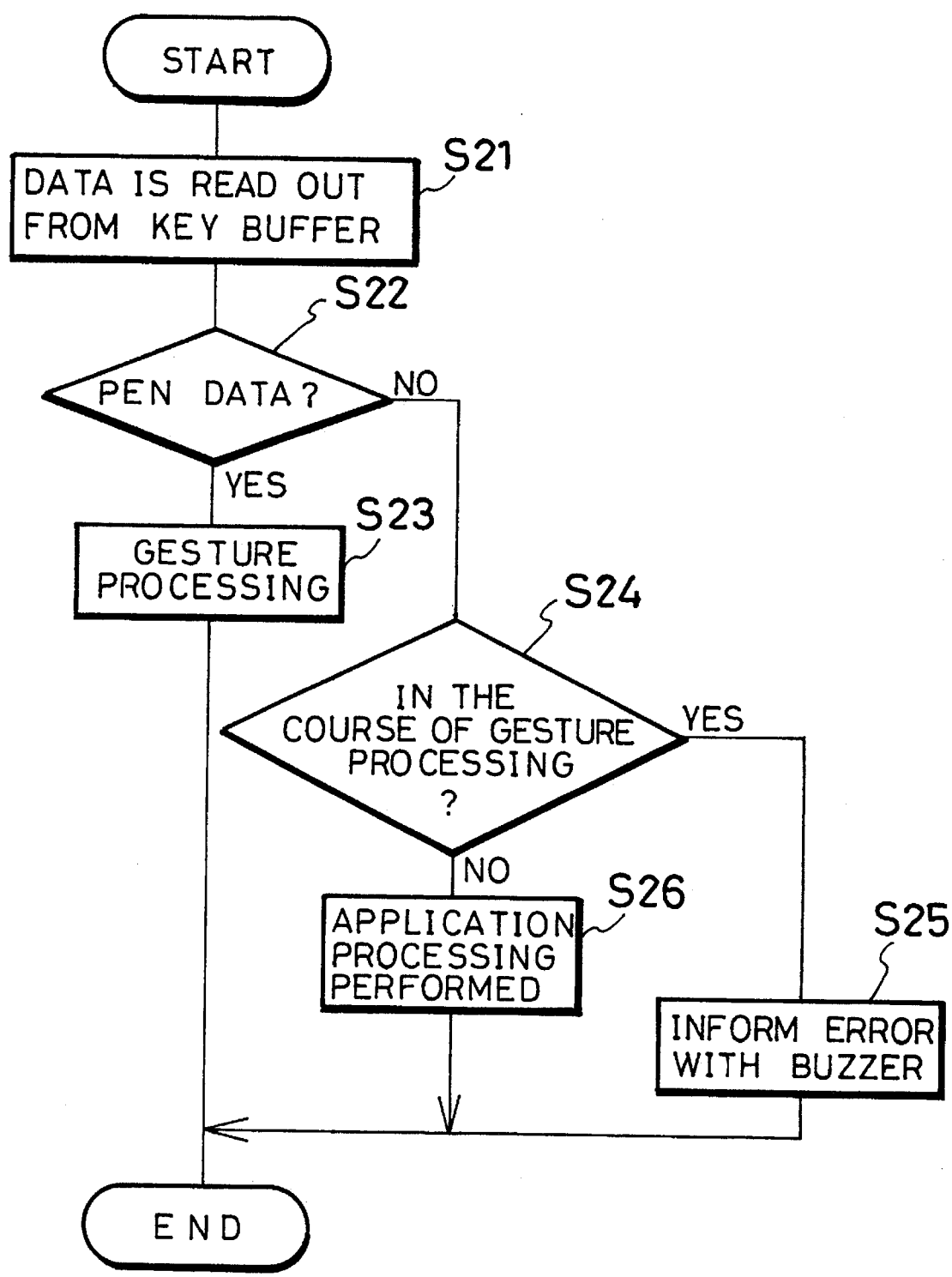
FIG. 10 is a flow chart showing a processing for nullifying the key inputting during executing of the gesture command.

When the inputting of the pen data or key data is completed, as shown in a flow chart of FIG. 10, the data is read out of the key buffer (S21). It is judged whether or not the data is the pen data (S22). When the data is the pen data, the gesture command is carried out (S23). Thus, the processing ends.

When it is judged in S22 that the data in the key buffer is the key data, it is judged whether or not the gesture command processing is now carried out (S24). When it is judged that the key inputting is carried out by the keyboard 15 in the course of the gesture command processing, it is informed by ringing the buzzer 19 that the error occurs (S25). In contrast, when it is judged not to be in the course of the gesture command processing, the application processing by operating of the key is carried out (S26).

The following description deals with a processing procedure of a case where the the line drawing handwritten by the input pen 16 is recognized as the gesture command when the editing instructions are inputted by handwriting.

Figure 11:
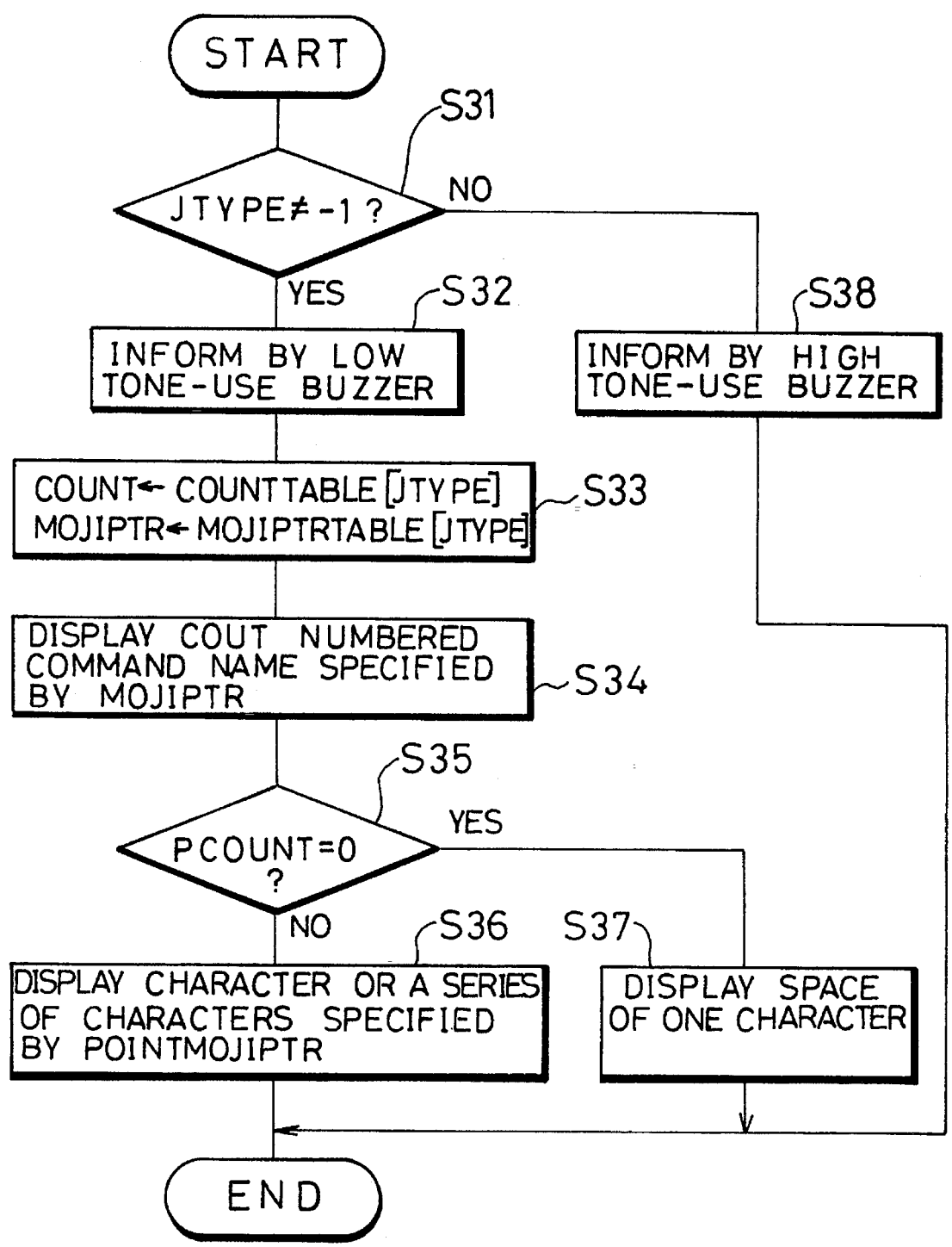
FIG. 11 is a flow chart showing a processing for informing a recognized result of the gesture command.

In the process, as shown in a flow chart of FIG. 11, it is judged whether or not the value of JTYPE is "1" (S31). The fact that the value of JTYPE is not "1" indicates that the gesture command is recognized, and is informed by ringing the buzzer 19 in the low tone (S32). The character number of the command name, which varies depending on the value of the JTYPE, is read out of the COUNTTABLE[JTYPE] and is set to the COUNT (working counter). The pointer indicative of the head end of the address of the above-mentioned command name is also read out of the MOJIPTRTABLE[JTYPE], and is set to the MOJIPTR (working pointer) (S33).

Next, the command name displaying area 27 displays the command name, specified by the MOJIPTR, by the character number of the COUNT (S34), and it is judged whether or not the PCOUNT is "0" (S35). When a character or a series of characters to be edited exists, the PCOUNT becomes "1". In such case, the editing character displaying area 28 displays the character or the character of the head end of the series of characters specified by the POINTMOJIPTR (S36).

In contrast, when the PCOUNT is "0" in S35, the space corresponding to one character is displayed by the editing character displaying area 28 (S37). When the JTYPE is "1" in S31, it is informed by ringing the buzzer 19 in the high tone that the gesture command is not recognized (S38).

When it is verified that the gesture command is recognized in the above-mentioned manner, the gesture command is carried out. Note that the present pen input processing apparatus is arranged such that one line drawing can carry out the same editing processing with respect to one character and a plurality of characters. The following description deals with such processing procedure.

Figure 12:
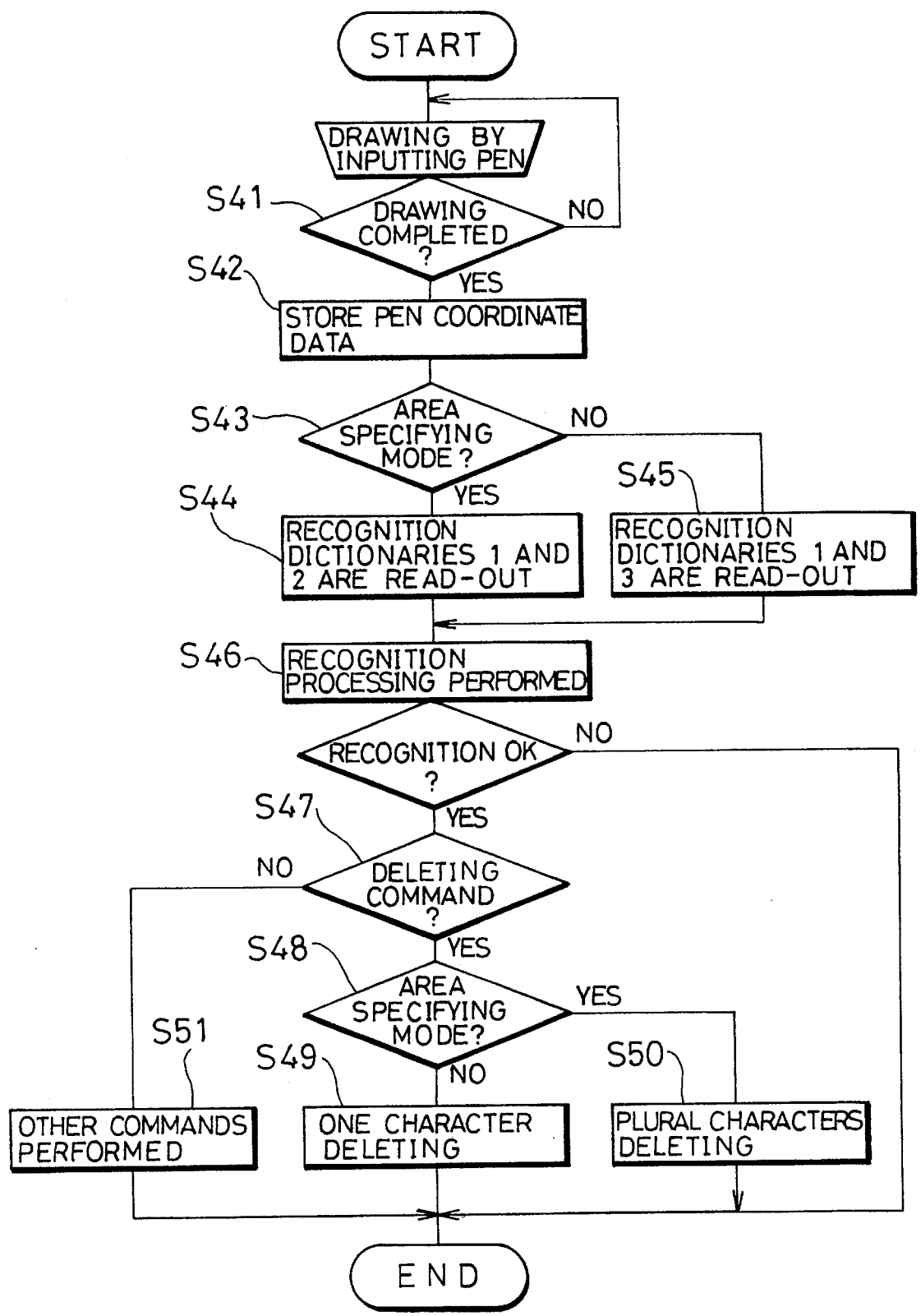
FIG. 12 is a flow chart showing a processing of the gesture command during the ordinary editing mode and the area specifying mode.

As shown in a flow chart of FIG. 12, after starting to draw the editing instruction with the input pen 16, (1) when the input pen 16 is up (unlike the case of character inputting by handwriting), or (2) when the key inputting is carried out by the keyboard 15, the drawing is judged to be completed (S41). In order to send all the data of trace coordinates of the line drawing to the gesture command judging section 36, all the data are temporarily stored in a specific area of the RAM 2 until the drawing ends (S42).

In the process of the gesture command recognition, the current inputting mode is first recognized so as to judge whether or not the inputting mode is the area specifying mode (S43). When it is judged as the area specifying mode, the dictionaries 17-1 and 17-2 are read out of the handwriting recognition dictionary 17 through the editing-use interface 10 (S44). When it is not the area specifying mode, the dictionaries 17-1 and 17-3 are read out of the handwriting recognition dictionary 17 (S45).

Subsequently, the recognition processing is carried out (S46), and when the gesture command corresponding to the shape of the line drawing is recognized by the gesture command judging section 36, the recognized gesture command is outputted. In such case, when the gesture command is not recognized, it is processed as an error.

When the gesture command is recognized, it is judged whether the gesture command is a deleting command such as the one character deleting command and partial deleting command (S47). When it is judged as the deleting command, it is judged whether or not the current mode is the area specifying mode (S48). In S48, when it is not the area specifying mode, only one character is deleted (S49), and the processing ends here. In S48, when it is the area specifying mode, a plurality of characters are deleted (S50), and the processing ends here. In S47, when it is judged that the gesture command is not the deleting command, the editing processing is carried out in accordance with other kinds of commands (S51), and the processing ends here.

As mentioned above, the pen input processing apparatus of the present embodiment is arranged such that when a line drawing indicative of character inputting by handwriting is inputted and the corresponding gesture command is recognized, the handwritten recognition-use inputting board 24 is displayed on the screen 21. Thus, only by drawing the line drawing on the position where the inputting by handwriting is directly carried out, the handwritten recognition-use inputting board 24 and the window 22 are simultaneously displayed and the character inputting by handwriting is available, thereby making it simple and easy to handle.

In contrast, the present pen input processing apparatus is arranged such that when the key operation is mistakenly done during processing of the gesture command, the key inputting is nullified, thereby avoiding the occurrence of error operations due to the interrupting of key data. It is informed by ringing the buzzers whether or not the gesture command is correctly recognized, thereby making it easy to verify. Further, when the gesture command is correctly recognized, both the command name and the character to be edited are displayed, thereby certainly enabling to verify that the gesture command is recognized.

Further, only one gesture command is used for editing processing which is commonly carried out with respect to the case where one character is to be edited and the case where a plurality of characters of the specified area are to be edited. Accordingly, the increase of the command number is suppressed to the minimal number and the lowering of the recognizing speed and recognizing ratio can be suppressed. In addition thereto, in the area specifying mode, the limiting kinds of the line drawings of the objects to be recognized can avoid the error operation. For example, it is possible not to carry out the gesture command such as inserting of character which causes the error operation during the area specifying mode. When the kinds of the line drawings are limited as mentioned above, the recognition processing is simplified, thereby improving the recognizing speed and recognizing ratio.

[Second Embodiment]

Figure 14:
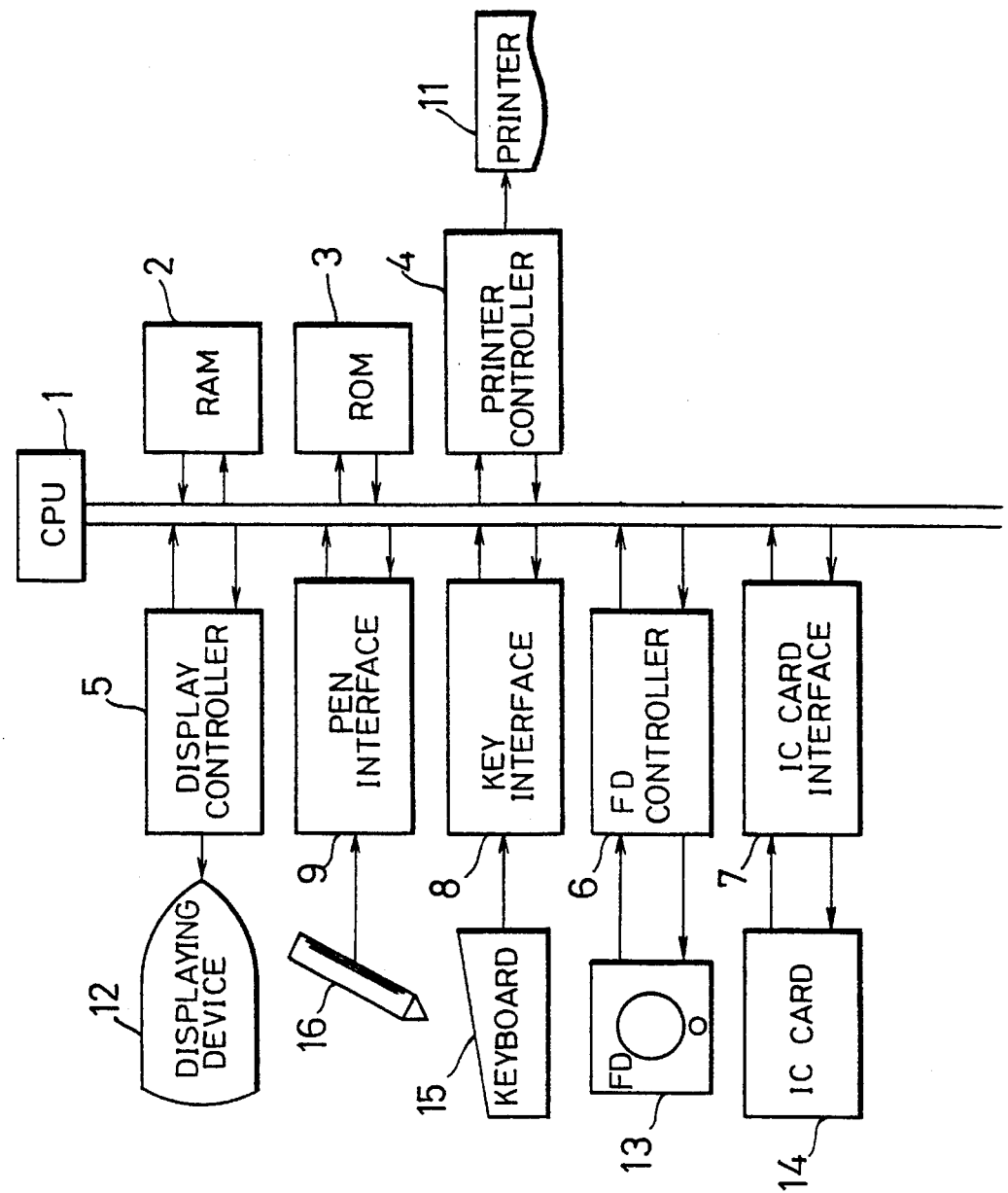
FIG. 14 is a block diagram showing the basic structure of a pen input processing apparatus of another embodiment in accordance with the present invention.
Figure 15:
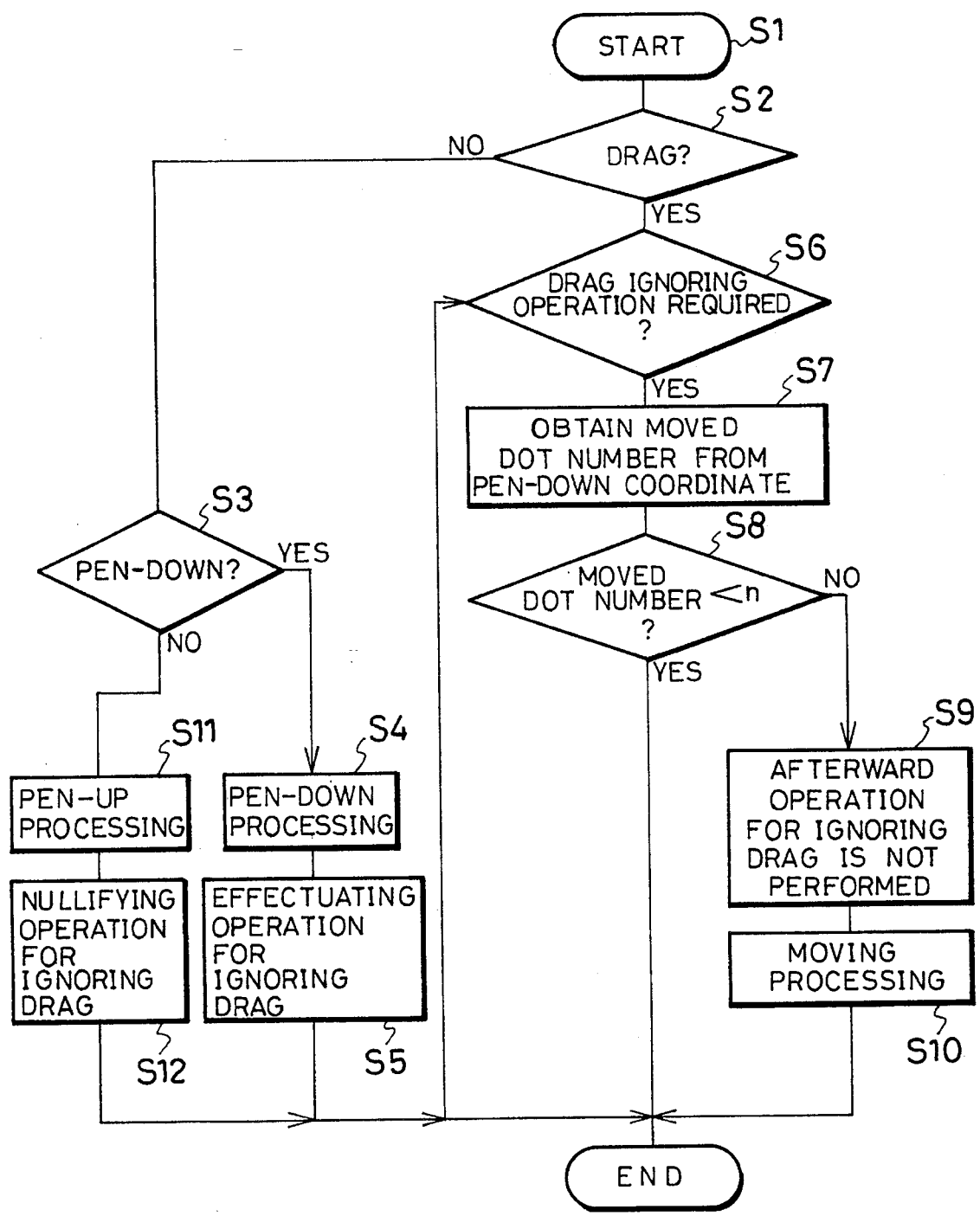
FIG. 15 is a flow chart showing processing wherein the pen input processing apparatus of FIG. 14 ignores a deflection of the inputting pen.
Figure 16A:
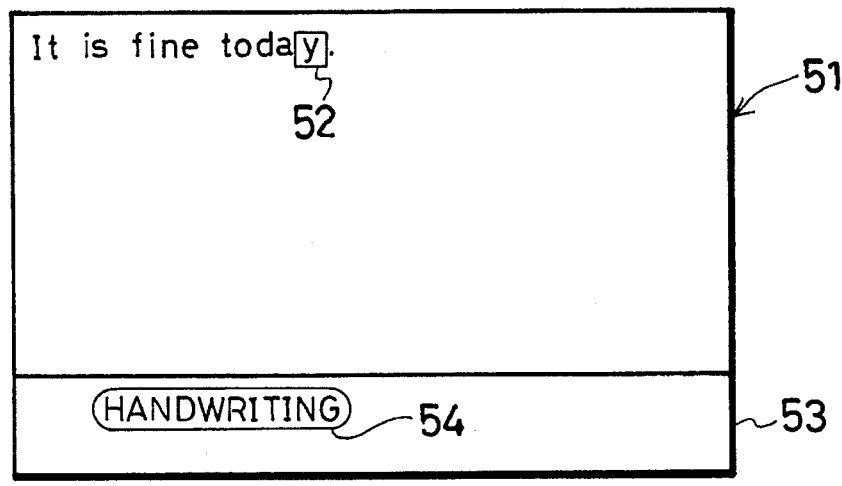
FIGS. 16(a) to 16(c) are explanatory diagrams showing displaying of a screen and processing during inputting of character by handwriting in a conventional pen input processing apparatus.
Figure 16B:
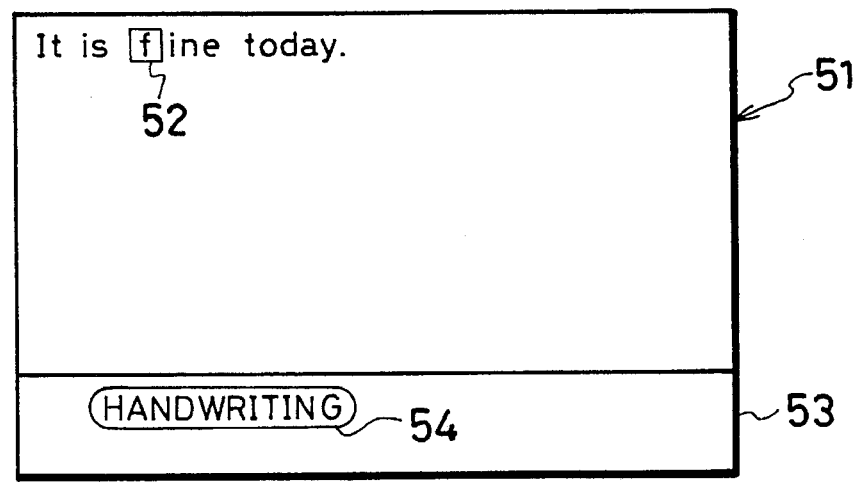
Figure 16C:
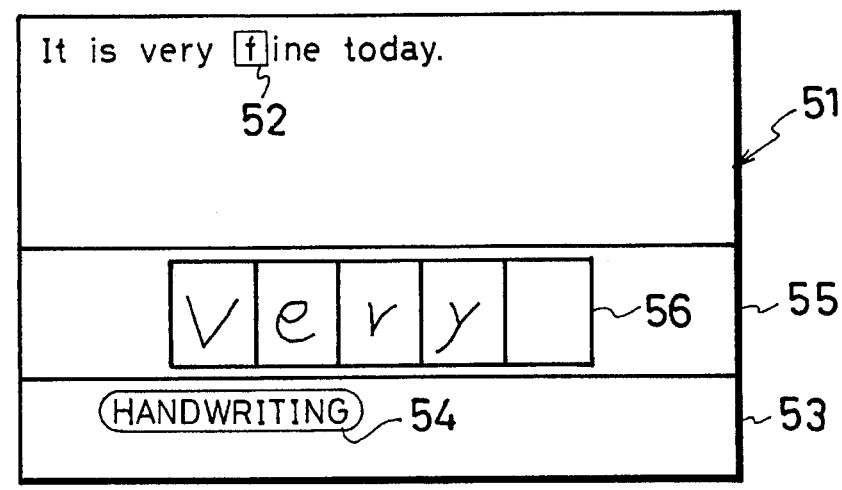
Figure 17A:
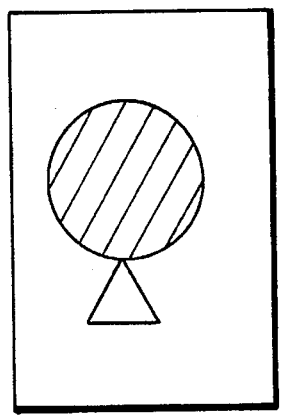
FIGS. 17(a) to 17(g) are explanatory diagrams showing an example of error operations in a conventional pen input processing apparatus.
Figure 17B:
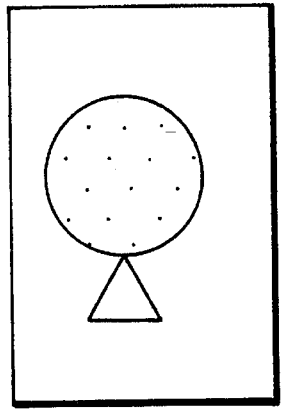
Figure 17C:
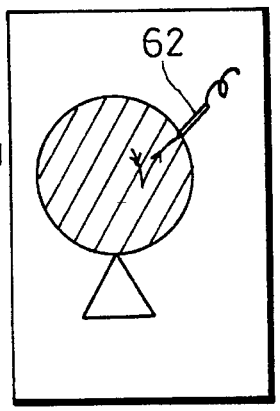
Figure 17D:
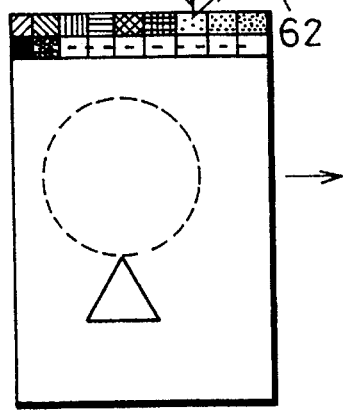
Figure 17E:
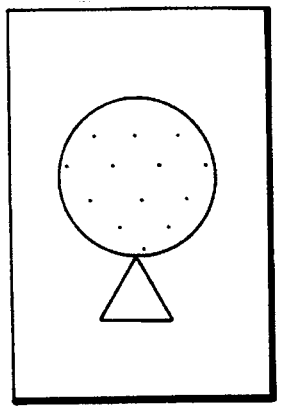
Figure 17F:
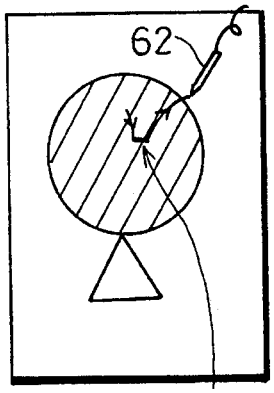
Figure 17G:
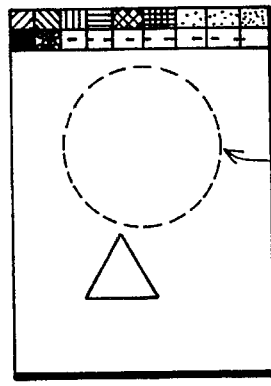

The following description deals with another embodiment of the present invention with reference to FIGS. 14 and 15. Note that the same reference numerals are assigned to the members which have the same functions as those shown in Figures of the foregoing embodiment, and the explanations thereof are omitted.

A pen input processing apparatus in accordance with the present embodiment is proposed in order to resolve the problem that a pen deflection generated during a series of operations of the pen-down and pen-up causes the graphic and frame specified by the inputting pen to undesirously move.

The present pen input processing apparatus, as shown in FIG. 14, has a configuration wherein the editing-use interface 10 and handwriting recognition dictionary 17 of FIG. 2 are omitted. Note that a pen interface 9 of the present embodiment judges the kind of an event due to the operation of an input pen 16 and a coordinate of the point on a screen which is pressed by the input pen 16 so as to output the data indicative of the event kind and the coordinate data. The kind of event indicates, for example, the pen-down/pen-up/drag.

In a case where the graphic and frame, which are displayed by the screen, are specified by the input pen 16, the occurrence of the event of pen-down is transmitted from the pen interface 9 through the CPU 1 to the application program stored in the ROM 3 or RAM 2. According to the application program, when the occurred event is the pen-down, the coordinate data, which is outputted due to the pen-down from the pen interface 9, is compared with the data of the currently displayed graphic stored in the RAM 2 so as to judge which kind of graphic is specified by the input pen 16. Thereafter, it is displayed that the corresponding graphic data is now the object for editing.

Following on the recognition of pen-down, when the pen interface 9 recognizes the event of drag (sliding of the input pen 16), the event is transmitted to the application program is shown in a flow chart of FIG. 15, it is judged whether or not the event of drag is effectuated according to the application program. More specifically, when the moving range of the input pen 16 is smaller than three dots for example, the event of drag is nullified.

The following description deals with an operation of the pen input processing apparatus of the present embodiment with reference to FIG. 15.

The processing flow starts from step (hereinafter referred to as S) 1, here the pen interface 9 judges which one of the pen-down, pen-up, and top end slide (drag) of the input pen 16 is carried out on the displaying device 12 as functioning of inputting tablet. When one of them is recognized, the next step is proceeded.

In S2, it is judged by the pen interface 9 whether or not the event is the drag. It is assumed that the input pen 16 is now put down. Since the event is not the drag in this case, the judged result of S2 is "NO" and S3 is selected as the next step. According to the present embodiment, when the event is judged as the pen-down in S3, a flag "1" indicative of effectuating the processing for nullifying the drag is set in S5 through S4. The flag is set in the RAM 2. Simultaneously, a coordinate at which the input pen 16 is put down (hereinafter referred to as pen-down coordinate) is detected and stored in the RAM 2. Such processings are carried out in S5.

In S6, it is judged to give top priority to the processing for ignoring the drag, since the flag "1" is already set in accordance with the pen-down and kept being set. As a result, in S7, it is obtained in the RAM 2 how many dots the input pen 16 slides from the pen-down coordinate (hereinafter referred to as the moved dot number). In S8, the moved dot number is compared with a predetermined dot number (for example, three dots), and the drag is ignored when the moved dot number is smaller than the predetermined dot number.

When the moved dot number is greater than the predetermined dot number in S8, the processing for ignoring the drag is nullified, and the flag is set to "0" (i.e., the flag is reset), thereafter the processing for ignoring the drag is not carried out. Namely, the moving processing of the graphic and frame is carried out in accordance with the instructions of the input pen 16.

When the input pen 16 is put up in S3, the judged result of S3 is "NO", thereby selecting S11 as the next step. According to the present embodiment, when it is judged in S3 that the event is the pen-up, the flag is reset to "0" in S12 through S11 so as to nullify the processing for ignoring the drag. The resetting of flag to "0" is carried out in the RAM 2. Simultaneously, a coordinate, at which the input pen 16 is put up, is detected and stored in the RAM 2. Thereafter, the moving processing corresponding to the pen-down and pen-up and other processings are instructed.

As mentioned above, the invention of the present embodiment is adaptable to all the processing apparatus, having a pen as inputting means, which specifies a graphic and frame on a screen in accordance with the pen-down and moves them in accordance with the drag operation. When the graphic and frame are specified by a series of operations of the pen-down and pen-up, the undesired drag which is frequently occurred due to the pen deflection is ignored, thereby making it easy to specify the graphic and frame.

There are described above novel features which the skilled man will appreciate give rise to advantages. These are each independent aspects of the invention to be covered by the present application, irrespective of whether or not they are included wihtin the scope of the following claims.

What is claimed is:

1. A pen input processing apparatus comprising:

displaying means having a screen for displaying information:

inputting means for carrying out inputting by handwriting with respect to said screen:

first memory means for storing editing instructions corresponding to respective handwritten line drawings;

recognizing means for recognizing an inputted editing instruction corresponding to a handwritten line drawing in accordance with the editing instructions stored in said first memory means and the handwritten line drawing when the handwritten line drawing is inputted by said inputting means to overlap information displayed on said screen;

handwriting input area displaying means for displaying a handwriting input area to facilitate character inputting with respect to said screen when said recognizing means recognizes an editing instruction for instructing the character inputting by handwriting, said handwriting input area comprising a plurality of windows;

said inputting means including coordinate information generating means for generating a coordinate information of the handwritten line drawing on said screen;

said first memory means including a first memory area for storing data of a basic stroke of each character;

said recognizing means comparing the basic stroke data with the coordinate information so as to specify which handwritten character is handwritten to said handwriting input, area;

said handwriting input area displaying means including frame data generating means for generating frame data which is required for displaying the plurality of windows in said handwriting input area, one character being written in each one of said windows;

said inputting means including pen means for motivating said coordinate information generating means to generate the coordinate information by touching said screen therewith;

controlling means, connected with said inputting means, for judging whether or not the inputting by handwriting is completed; and wherein said controlling means judges that the inputting of character by handwriting is completed with respect to a first window of the plurality of windows when said pen means, carrying out the inputting by handwriting with respect to the first window, touches a second window.

2. The pen input processing apparatus as set forth in claim 1, wherein said handwriting input area displaying means includes:

frame data generating means for generating frame data which is required for displaying in the handwriting input area a writing area through which the character is written in;

second memory means for temporarily storing displaying data for displaying the information on said screen; and synthetic data generating means for synthesizing the frame data and displaying data, and for outputting the synthesized data to said displaying means.

3. The pen input processing apparatus as set forth in claim 2, wherein said synthetic data generating means includes a bit map memory.

4. The pen input processing apparatus as set forth in claim 1, wherein:

said inputting means includes coordinate information generating means for generating a coordinate information of the handwritten line drawing on said screen, said first memory means includes a first memory area for storing data of a basic stroke of each character, and said recognizing means compares the basic stroke data with the coordinate information so as to specify which handwritten character is handwritten to said handwriting input area.

5. The pen input processing apparatus as set forth in claim 4, wherein said handwriting input area displaying means includes:

frame data generating means for generating frame data which is required for displaying a plurality of windows in said handwriting input area, one character being written in each one of said windows.

6. The pen input processing as set forth in claim 5, wherein said inputting means includes:

pen means for motivating said coordinate information generating means to generate the coordinate information by touching said screen therewith.

7. The pen input processing apparatus as set forth in claim 1, wherein said inputting means includes:

a pen;

a transparent plate which is overlapped onto said screen; and tablet means for outputting a coordinate of a point, on said transparent plate, which is touched by said pen.

8. The pen input processing apparatus as set forth in claim 7, wherein said tablet means includes a handwriting button by which an instruction is inputted for changing inputting mode of information into mode for inputting of character by handwriting.

9. The pen input processing apparatus as set forth in claim 7, further comprising:

trace drawing means for generating data of a trace image of the handwritten line drawing upon receipt of the coordinate information from said tablet means.

10. The pen input processing apparatus as set forth in claim 9, further comprising:

second memory means for temporarily storing displaying data for displaying information on said screen; and synthetic data generating means for synthesizing the frame data and displaying data, and for outputting the synthesized data to said displaying means.

11. The pen input processing apparatus as set forth in claim 1, wherein said inputting means includes pen means for motivating said coordinate information generating means to generate the coordinate information by touching said screen therewith.

12. The pen input processing apparatus as set forth in claim 11, further comprising:

controlling means, connected with said inputting means, for judging whether or not the inputting by handwriting is completed, wherein said controlling means judges that the inputting of editing instruction by handwriting is completed when said pen means touching said screen leaves said screen.

13. The pen input processing apparatus as set forth in claim 1, wherein said first memory means includes:

a second memory area for storing an application program executing the editing instruction.

14. The pen input processing apparatus as set forth in claim 13, further comprising:

editing means for executing the editing instruction in accordance with the application program upon receipt of the coordinate information and the editing instruction which is recognized by said recognizing means.

15. The pen input processing apparatus as set forth in claim 13, further comprising:

a central processing unit for controlling operations of said pen input processing apparatus, wherein said inputting means and recognizing means include respective interfaces, each interface being connected with said central processing unit through a bus.

16. The pen input processing apparatus of claim 1, further comprising:

keyboard means for generating key data for key inputting in accordance with key operations; and key input nullifying means for nullifying the key inputting during editing in accordance with the handwritten input.

17. The pen input processing apparatus as set forth in claim 16, further comprising:

second memory means for temporarily storing interrupting data from said inputting means, and for temporarily storing interrupting key data from said keyboard means.

18. The pen input processing apparatus as set forth in claim 17, wherein said key input nullifying means includes:

means for reading the data out of said second memory means, and for judging whether the data is the interrupting data or the interrupting key data; and informing means for informing an error when the data is the interrupting key data and the editing processing is carried out in accordance with the handwritten input.

19. The pen input processing apparatus as set forth in claim 17, wherein said key input nullifying means includes:

means for reading the data out of said second memory means, and for judging whether the data is the interrupting data or the interrupting key data; and editing means for carrying out an edting instruction which is inputted by handwriting and is recognized by said recognizing means when it is judged that the data is the interrupting data.

20. The pen input processing apparatus of claim 1, further comprising:

informing means for generating a sound to confirm that the editing instruction has been recognized by said recognizing means.

21. The pen input processing apparatus as set forth in claim 20, wherein sad informing means includes:

a first sound source for informing by a first sound that the editing instruction is recognized by said recognizing means; and a second sound source for informing by a second sound that the editing instruction is not recognized by said recognizing means, the first and second sounds being different from each other.

22. The pen input processing apparatus of clain 1, further comprising:

a pen;

tablet means for outputting a coordinate information of a point which is touched by said pen;

judging means for judging a greater:
(1) an actual distance between a first point and a second point, or
(2) a reference distance, said judging occurring when said pen touches the first point on said tablet means, slides on said tablet means and leaves said tablet means at the second point; and processing means for ignoring the sliding of said pen when the actual distance is smaller than the reference distance.

23. The pen input processing apparatus as set forth in claim 22, wherein the controlling means instructs said processing means to ignore sliding of said pen based on a fact that said pen touched the first point.

24. The pen input processing apparatus as set forth in claim 22, wherein the controlling means sends to said processing means a first instruction for ignoring the sliding of said pen based on the fact that said pen touched the first point, and sends a second instruction to said processing means so as to ignore the first instruction when said judging means judges that the distance is greater than the reference value.

25. The pen input processing apparatus as set forth in claim 1, further comprising:

means for displaying a cursor specifying a position on said screen; and means for scrolling the information currently displayed on said screen such that the cursor is not hidden by said displayed handwriting input area at the same time as said handwriting input area displaying means selectively displays said handwriting input area.

26. A pen input processing apparatus comprising:

displaying means having a screen for displaying information;

inputting means for carrying out inputting by handwriting with respect to said screen;

first memory means for storing editing instructions corresponding to respective handwritten line drawings;

recognizing means for recognizing an inputted editing instruction corresponding to a handwritten line drawing in accordance with the editing instructions stored in said first memory means and the handwritten line drawing when the handwritten line drawing is inputted by said inputting means to overlap information displayed on said screen; and editing instruction displaying means, when the editing instruction corresponding to the handwritten line drawing is recognized by said recognizing means, said editing instruction displaying means causing a name of the editing instruction to appear on said screen so as to indicate the recognition of the editing instruction.

27. The pen input processing apparatus as set forth in claim 26, wherein said editing instruction displaying means includes:

editing object displaying means for displaying in a specified area on said screen one character which is specified as an object for the editing instruction recognized by said recognizing means.

28. The pen input processing apparatus as set forth in claim 27, further comprising:

second memory means for temporarily storing displaying data for displaying information on said screen, wherein said inputting means includes coordinate information generating means for generating a coordinate information of the handwritten line drawing on said screen, and said editing object displaying means judges a character of editing object in accordance with the displaying data and coordinate information.

29. The pen input processing apparatus as set forth in claim 26, wherein said editing instruction displaying means includes:

editing object displaying means for displaying in a specified area on said screen at least one head end character of a plurality of characters which are specified as an object for the editing instruction recognized by said recognizing means.

30. The pen input processing apparatus as set forth in claim 26, wherein said editing instruction displaying means includes:

editing object displaying means for displaying in a specified area on said screen at least one character of an information which are specified as an object for the editing instruction recognized by said recognizing means.

31. The pen input processing apparatus as set forth in claim 30, wherein said editing instruction displaying means includes:

area data generating means for generating a first and second area data, the first area data being for making an instruction displaying area visible where the name of the editing instruction is displayed, the second area data being for making an editing character displaying area visible where a character to be edited is displayed;

second memory means for temporarily storing displaying data for displaying information on said screen; and synthetic data generating means for synthesizing the first area data, second area data and displaying data, and for outputting the synthesized data to said displaying means.

32. The pen input processing apparatus as set forth in claim 31, wherein said synthetic data generating means includes a bit map memory.

33. The pen input processing apparatus as set forth in claim 26, further comprising:

second memory means for randomly writing in and reading out, wherein said first memory means includes a first memory area for storing a code corresponding to the editing instruction, and said editing instruction displaying means reads from said first memory means a code corresponding to the editing instruction so as to temporarily store in said second memory means for preparing to display on said screen the editing instruction recognized by said recognizing means.

34. The pen input processing apparatus as set forth in claim 33, wherein said editing instruction displaying means includes:

character data generating means for converting the code into character data.

35. A pen input processing apparatus comprising:

a display device for displaying information on a screen;

a pen input device on which handwritten line drawings are made with a pen in positional relation to the screen;

a first memory for storing a library of editing instructions corresponding to respective handwritten line drawings;

a controller which recognizes an inputted editing instruction corresponding to a handwritten line drawing in accordance with the editing instructions stored in the first memory and which drives the display device whereby the screen includes a visual display of the following in predetermined fields of the screen:

(1) a name of the inputted editing instruction recognized by the controller;

(2) an indication of character(s) on the screen affected by the inputted editing instruction; and (3) a handwriting input area wherein handwritten characters can be written with the pen for modifying an affected area of the screen, the controller automatically scrolling the screen when necessary whereby both the affected area of the screen and the handwriting input area are simultaneously displayed thereon.

* * * * *